United States Patent
Mittricker et al.

(10) Patent No.: US 9,903,279 B2
(45) Date of Patent: Feb. 27, 2018

(54) SYSTEMS AND METHODS FOR OPTIMIZING STOICHIOMETRIC COMBUSTION

(75) Inventors: Franklin F. Mittricker, Jamul, CA (US); Richard A. Huntington, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 736 days.

(21) Appl. No.: 13/805,646

(22) PCT Filed: Jun. 27, 2011

(86) PCT No.: PCT/US2011/042000
§ 371 (c)(1),
(2), (4) Date: Dec. 19, 2012

(87) PCT Pub. No.: WO2012/018457
PCT Pub. Date: Feb. 9, 2012

(65) Prior Publication Data
US 2013/0125555 A1 May 23, 2013

Related U.S. Application Data

(60) Provisional application No. 61/371,523, filed on Aug. 6, 2010.

(51) Int. Cl.
*F02C 9/20* (2006.01)
*F02C 9/50* (2006.01)
(Continued)

(52) U.S. Cl.
CPC ............... *F02C 9/20* (2013.01); *F01K 23/10* (2013.01); *F02C 3/34* (2013.01); *F02C 9/50* (2013.01);
(Continued)

(58) Field of Classification Search
CPC ...... F02C 6/00; F02C 6/16; F02C 6/06; F02C 6/08; F02C 6/10; F02C 9/20; F02C 3/13; F02K 9/50; F02K 9/44
See application file for complete search history.

(56) References Cited

U.S. PATENT DOCUMENTS 3,705,492 A 12/1972 Vickers ........................ 60/39.51
3,841,382 A 10/1974 Gravis, III et al. ......... 159/16 R
(Continued)

FOREIGN PATENT DOCUMENTS

CA 2231749 3/1998
CA 2550675 7/2005
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — Craig Kim
(74) *Attorney, Agent, or Firm* — ExxonMobil Upstream Research Company Law Department

(57) ABSTRACT

Provided are more efficient techniques for operating gas turbine systems. In one embodiment a gas turbine system comprises an oxidant system, a fuel system, a control system, and a number of combustors adapted to receive and combust an oxidant from the oxidant system and a fuel from the fuel system to produce an exhaust gas. The gas turbine system also includes a number of oxidant-flow adjustment devices, each of which are operatively associated with one of the combustors, wherein an oxidant-flow adjustment device is configured to independently regulate an oxidant flow rate into the associated combustor. An exhaust sensor is in communication with the control system. The exhaust sensor is adapted to measure at least one parameter of the exhaust gas, and the control system is configured to independently adjust each of the oxidant-flow adjustment devices based, at least in part, on the parameter measured by the exhaust sensor.

31 Claims, 16 Drawing Sheets

(51) Int. Cl.
*F01K 23/10* (2006.01)
*F02C 3/34* (2006.01)

(52) U.S. Cl.
CPC .... *F05D 2270/08* (2013.01); *F05D 2270/083* (2013.01); *Y02E 20/16* (2013.01); *Y02T 50/677* (2013.01)

(56) References Cited

U.S. PATENT DOCUMENTS

| | | | |
|---|---|---|---|
| 4,043,395 A | 8/1977 | Every et al. | 166/263 |
| 4,050,239 A | 9/1977 | Kappler et al. | 60/39.51 |
| 4,160,640 A | 7/1979 | Maev et al. | 431/9 |
| 4,171,349 A | 10/1979 | Cucuiat et al. | 423/574 |
| 4,271,664 A | 6/1981 | Earnest | 60/39.18 |
| 4,344,486 A | 8/1982 | Parrish | 166/272 |
| 4,414,334 A | 11/1983 | Hitzman | 435/262 |
| 4,434,613 A | 3/1984 | Stahl | 60/39.7 |
| 4,498,289 A | 2/1985 | Osgerby | 60/39.52 |
| 4,753,666 A | 6/1988 | Pastor et al. | 62/24 |
| 4,762,543 A | 8/1988 | Pantermuehl et al. | 62/28 |
| 4,858,428 A | 8/1989 | Paul | 60/39.17 |
| 4,895,710 A | 1/1990 | Hartmann et al. | 423/351 |
| 4,976,100 A | 12/1990 | Lee | 60/39.02 |
| 5,014,785 A | 5/1991 | Puri et al. | 166/263 |
| 5,024,055 A | 6/1991 | Sato et al. | 60/39.27 |
| 5,085,274 A | 2/1992 | Puri et al. | 166/252 |
| 5,123,248 A | 6/1992 | Monty et al. | 60/740 |
| 5,141,049 A | 8/1992 | Larsen et al. | 165/133 |
| 5,147,111 A | 9/1992 | Montgomery | 299/16 |
| 5,184,459 A * | 2/1993 | McAndrews | 60/226.3 |
| 5,327,718 A | 7/1994 | Iwata et al. | 60/39.03 |
| 5,332,036 A | 7/1994 | Shirley et al. | 166/268 |
| 5,345,756 A | 9/1994 | Jahnke et al. | 60/39.02 |
| 5,388,395 A | 2/1995 | Scharpf et al. | 60/39.02 |
| 5,402,847 A | 4/1995 | Wilson et al. | 166/263 |
| 5,444,971 A | 8/1995 | Holenbrger | 60/39.02 |
| 5,490,378 A | 2/1996 | Berger et al. | 60/39.23 |
| 5,533,329 A | 7/1996 | Ohyama et al. | 60/39.03 |
| 5,566,756 A | 10/1996 | Chaback et al. | 166/263 |
| 5,724,805 A | 3/1998 | Golomb et al. | 60/39.02 |
| 5,725,054 A | 3/1998 | Shayegi et al. | 166/263 |
| 5,901,547 A | 5/1999 | Smith et al. | 60/39.02 |
| 5,968,349 A | 10/1999 | Duyvesteyn et al. | 208/390 |
| 6,082,093 A | 7/2000 | Greenwood et al. | 60/39.23 |
| 6,089,855 A | 7/2000 | Becker et al. | 431/9 |
| 6,148,602 A | 11/2000 | Demetri | 60/39.05 |
| 6,201,029 B1 | 3/2001 | Waycuilis | 518/703 |
| 6,202,400 B1 | 3/2001 | Utamura et al. | 60/39.03 |
| 6,256,994 B1 | 7/2001 | Dillon | 60/649 |
| 6,263,659 B1 | 7/2001 | Dillon | 60/39.02 |
| 6,282,901 B1 | 9/2001 | Marin et al. | 60/649 |
| 6,289,666 B1 | 9/2001 | Ginter | 60/39.05 |
| 6,298,652 B1 | 10/2001 | Mittricker et al. | 60/39.02 |
| 6,298,654 B1 | 10/2001 | Vermes et al. | 60/39.02 |
| 6,298,664 B1 | 10/2001 | Asen et al. | 60/649 |
| 6,332,313 B1 | 12/2001 | Willis et al. | 60/39.06 |
| 6,345,493 B1 | 2/2002 | Smith et al. | 60/39.02 |
| 6,374,594 B1 | 4/2002 | Kraft et al. | 60/39.37 |
| 6,389,814 B2 | 5/2002 | Viteri et al. | 60/716 |
| 6,405,536 B1 | 6/2002 | Ho et al. | 60/742 |
| 6,412,559 B1 | 7/2002 | Gunter et al. | 166/271 |
| 6,450,256 B2 | 9/2002 | Mones | 166/250.01 |
| 6,477,859 B2 | 11/2002 | Wong et al. | 62/617 |
| 6,508,209 B1 | 1/2003 | Collier | 123/3 |
| 6,598,402 B2 | 7/2003 | Kataoka et al. | 60/775 |
| 6,637,183 B2 | 10/2003 | Viteri et al. | 60/39.182 |
| 6,655,150 B1 | 12/2003 | Asen et al. | 60/772 |
| 6,702,570 B2 | 3/2004 | Shah et al. | 431/11 |
| 6,722,135 B2 | 4/2004 | Davis, Jr. et al. | 60/773 |
| 6,722,436 B2 | 4/2004 | Krill | 166/303 |
| 6,745,573 B2 | 6/2004 | Marin et al. | 60/775 |
| 6,790,030 B2 | 9/2004 | Fischer et al. | 431/8 |
| 6,810,655 B2 | 11/2004 | Davis, Jr. et al. | 60/39.281 |
| 6,907,737 B2 | 6/2005 | Mittricker et al. | 60/772 |
| 6,910,335 B2 | 6/2005 | Viteri et al. | 60/786 |
| 6,945,029 B2 | 9/2005 | Viteri | 60/39.17 |
| 7,043,920 B2 | 5/2006 | Viteri et al. | 60/716 |
| 7,065,953 B1 | 6/2006 | Kopko | 60/39.3 |
| 7,089,743 B2 | 8/2006 | Frutschi et al. | 60/772 |
| 7,124,589 B2 | 10/2006 | Neary | 60/784 |
| 7,143,572 B2 | 12/2006 | Ooka et al. | 60/39.182 |
| 7,147,461 B2 | 12/2006 | Neary | 431/5 |
| 7,266,940 B2 | 9/2007 | Balan et al. | 60/39.181 |
| 7,284,362 B2 | 10/2007 | Marin et al. | 60/39.182 |
| 7,305,831 B2 | 12/2007 | Carrea et al. | 60/772 |
| 7,357,857 B2 | 4/2008 | Hart et al. | 208/391 |
| 7,363,756 B2 | 4/2008 | Carrea et al. | 60/39.52 |
| 7,401,577 B2 | 7/2008 | Saucedo et al. | 122/448.1 |
| 7,472,550 B2 | 1/2009 | Lear et al. | 62/238.3 |
| 7,481,275 B2 | 1/2009 | Olsvik et al. | 166/303 |
| 7,491,250 B2 | 2/2009 | Hershkowitz et al. | 48/198.7 |
| 7,503,178 B2 | 3/2009 | Bucker et al. | 60/774 |
| 7,516,626 B2 | 4/2009 | Brox et al. | 62/643 |
| 7,536,873 B2 | 5/2009 | Nohlen | 62/644 |
| 7,559,977 B2 | 7/2009 | Fleischer et al. | 95/236 |
| 7,566,394 B2 | 7/2009 | Koseoglu | 208/309 |
| 7,637,093 B2 | 12/2009 | Rao | 60/39.52 |
| 7,650,744 B2 | 1/2010 | Varatharajan et al. | 60/39.12 |
| 7,654,320 B2 | 2/2010 | Payton | 166/257 |
| 7,752,848 B2 | 7/2010 | Balan et al. | 60/780 |
| 7,752,850 B2 | 7/2010 | Laster et al. | 60/794 |
| 7,762,084 B2 | 7/2010 | Martis et al. | 60/792 |
| 7,765,810 B2 | 8/2010 | Pfefferle | 60/777 |
| 8,117,846 B2 | 2/2012 | Wilbraham | 60/748 |
| 8,365,537 B2 | 2/2013 | Li et al. | 60/772 |
| 2001/0015061 A1 | 8/2001 | Viteri et al. | 60/39.161 |
| 2002/0036086 A1 | 3/2002 | Minkkinen et al. | 166/266 |
| 2002/0166323 A1 | 11/2002 | Marin et al. | 60/775 |
| 2003/0000436 A1 | 1/2003 | Havlena | 110/347 |
| 2003/0131582 A1 | 7/2003 | Anderson et al. | 60/39.55 |
| 2003/0134241 A1 | 7/2003 | Marin et al. | 431/9 |
| 2003/0221409 A1 | 12/2003 | McGowan | 60/39.17 |
| 2003/0235529 A1 | 12/2003 | Hershkowitz et al. | 423/652 |
| 2004/0128975 A1 | 7/2004 | Viteri | 60/39.55 |
| 2004/0148941 A1 | 8/2004 | Wylie | 60/772 |
| 2004/0154793 A1 | 8/2004 | Zapadinski | 166/256 |
| 2004/0170558 A1 | 9/2004 | Hershkowitz | 423/652 |
| 2004/0170559 A1 | 9/2004 | Hershkowitz et al. | 423/652 |
| 2004/0175326 A1 | 9/2004 | Hershkowitz et al. | 423/652 |
| 2004/0180973 A1 | 9/2004 | Hershkowitz | 518/703 |
| 2004/0191166 A1 | 9/2004 | Hershkowitz et al. | 423/652 |
| 2004/0206091 A1 | 10/2004 | Yee et al. | 60/777 |
| 2004/0219079 A1 * | 11/2004 | Hagen et al. | 422/194 |
| 2004/0241505 A1 | 12/2004 | Hershkowitz et al. | 429/17 |
| 2005/0022499 A1 | 2/2005 | Belokon et al. | 60/39.511 |
| 2005/0028529 A1 | 2/2005 | Bartlett et al. | 60/772 |
| 2005/0123874 A1 | 6/2005 | Abbasi et al. | 431/351 |
| 2005/0132713 A1 | 6/2005 | Neary | 60/784 |
| 2005/0137269 A1 | 6/2005 | Hershkowitz et al. | 518/702 |
| 2005/0144961 A1 | 7/2005 | Colibaba-Evulet et al. | 60/780 |
| 2005/0154068 A1 | 7/2005 | Hershkowitz et al. | 518/703 |
| 2005/0186130 A1 | 8/2005 | Hughes et al. | 423/219 |
| 2005/0197267 A1 | 9/2005 | Zaki et al. | 510/245 |
| 2005/0201929 A1 | 9/2005 | Hershkowitz et al. | 423/652 |
| 2005/0236602 A1 | 10/2005 | Viteri et al. | 252/372 |
| 2006/0005542 A1 | 1/2006 | Campbell et al. | 60/723 |
| 2006/0112696 A1 | 6/2006 | Lynghjem et al. | 60/772 |
| 2006/0127827 A1 | 6/2006 | Yoshida et al. | 431/8 |
| 2006/0183009 A1 | 8/2006 | Berlowitz et al. | 429/19 |
| 2006/0188760 A1 | 8/2006 | Hershkowitz et al. | 429/17 |
| 2006/0196812 A1 | 9/2006 | Beetge et al. | 208/435 |
| 2006/0231252 A1 | 10/2006 | Shaw et al. | 166/272.3 |
| 2006/0260290 A1 | 11/2006 | Rao | 60/39.53 |
| 2007/0006565 A1 | 1/2007 | Fleischer et al. | 60/39.5 |
| 2007/0034171 A1 | 2/2007 | Griffin et al. | 122/479.1 |
| 2007/0044479 A1 | 3/2007 | Brandt et al. | 60/783 |
| 2007/0125063 A1 | 6/2007 | Evulat | 60/39.15 |
| 2007/0130957 A1 | 6/2007 | Hoffmann et al. | 60/780 |
| 2007/0144747 A1 | 6/2007 | Steinberg | 166/402 |
| 2007/0144940 A1 | 6/2007 | Hershkowitz et al. | 208/107 |
| 2007/0178035 A1 | 8/2007 | White et al. | 423/248 |
| 2007/0220864 A1 | 9/2007 | Haugen | 60/286 |
| 2007/0227156 A1 * | 10/2007 | Saito et al. | 60/772 |
| 2007/0237696 A1 | 10/2007 | Payton | 423/228 |

(56) References Cited

U.S. PATENT DOCUMENTS

| | | | |
|---|---|---|---|
| 2007/0240425 A1 | 10/2007 | Malavasi et al. | 60/775 |
| 2007/0245736 A1 | 10/2007 | Barnicki | 60/670 |
| 2007/0249738 A1 | 10/2007 | Haynes et al. | 518/702 |
| 2007/0272201 A1 | 11/2007 | Amano et al. | 123/295 |
| 2007/0295640 A1 | 12/2007 | Tan et al. | 208/22 |
| 2008/0006561 A1 | 1/2008 | Moran et al. | 208/45 |
| 2008/0010967 A1 | 1/2008 | Griffin et al. | 60/39.182 |
| 2008/0016868 A1 | 1/2008 | Ochs et al. | 60/688 |
| 2008/0038598 A1 | 2/2008 | Berlowitz et al. | 429/17 |
| 2008/0066443 A1 | 3/2008 | Frutschi et al. | 60/39.53 |
| 2008/0083226 A1 | 4/2008 | Joshi et al. | 60/772 |
| 2008/0092539 A1 | 4/2008 | Marshall et al. | 60/599 |
| 2008/0104938 A1 | 5/2008 | Finkenrath et al. | 60/39.5 |
| 2008/0104939 A1 | 5/2008 | Hoffmann et al. | 60/39.5 |
| 2008/0104958 A1 | 5/2008 | Finkenrath et al. | 60/605.2 |
| 2008/0115495 A1 | 5/2008 | Rising | 60/731 |
| 2008/0118310 A1 | 5/2008 | Graham | 405/129.95 |
| 2008/0127632 A1 | 6/2008 | Finkenrath et al. | 60/274 |
| 2008/0141643 A1 | 6/2008 | Varatharajan et al. | 60/39.5 |
| 2008/0142409 A1 | 6/2008 | Sankaranarayanan et al. | 208/62 |
| 2008/0155984 A1 | 7/2008 | Liu et al. | 60/649 |
| 2008/0173584 A1 | 7/2008 | White et al. | 210/656 |
| 2008/0275278 A1 | 11/2008 | Clark | 585/240 |
| 2008/0290719 A1 | 11/2008 | Kaminsky et al. | 299/3 |
| 2008/0302107 A1 | 12/2008 | Fan et al. | 60/783 |
| 2008/0309087 A1 | 12/2008 | Evulet et al. | 290/52 |
| 2008/0317651 A1 | 12/2008 | Hooper et al. | 423/230 |
| 2009/0038247 A1 | 2/2009 | Taylor et al. | 52/287.1 |
| 2009/0064653 A1 | 3/2009 | Hagen et al. | 60/39.3 |
| 2009/0100754 A1 | 4/2009 | Gil | 48/201 |
| 2009/0117024 A1 | 5/2009 | Weedon et al. | 423/437.1 |
| 2009/0133400 A1 | 5/2009 | Callas | 60/730 |
| 2009/0145127 A1 | 6/2009 | Vollmer et al. | 60/618 |
| 2009/0193809 A1 | 8/2009 | Schroder et al. | 60/762 |
| 2009/0194280 A1 | 8/2009 | Gil et al. | 166/272 |
| 2009/0205334 A1 | 8/2009 | Aljabari et al. | 60/605.2 |
| 2009/0218821 A1 | 9/2009 | ElKady et al. | 290/52 |
| 2009/0235671 A1 | 9/2009 | Rabovitser et al. | 60/806 |
| 2009/0241506 A1 | 10/2009 | Nilsson | 60/39.24 |
| 2009/0250264 A1 | 10/2009 | Dupriest | 175/42 |
| 2009/0284013 A1 | 11/2009 | Anand et al. | 290/52 |
| 2009/0301054 A1 | 12/2009 | Simpson et al. | 60/39.15 |
| 2009/0301099 A1 | 12/2009 | Nigro | 60/775 |
| 2010/0018218 A1 | 1/2010 | Riley et al. | 60/783 |
| 2010/0028142 A1 | 2/2010 | Hashimoto et al. | 415/200 |
| 2010/0064855 A1 | 3/2010 | Lanyi et al. | 75/458 |
| 2010/0077941 A1 | 4/2010 | D'Agostini | 110/188 |
| 2010/0115960 A1 | 5/2010 | Brautsch et al. | 60/772 |
| 2010/0126176 A1 | 5/2010 | Kim | 60/748 |
| 2010/0162703 A1 | 7/2010 | Li et al. | 60/670 |
| 2010/0180565 A1 | 7/2010 | Draper | 60/39.52 |
| 2010/0310439 A1 | 12/2010 | Brok et al. | 423/222 |
| 2010/0314136 A1 | 12/2010 | Zubrin et al. | 166/402 |
| 2010/0326084 A1 | 12/2010 | Anderson et al. | 60/775 |
| 2011/0000221 A1 | 1/2011 | Minta et al. | 60/783 |
| 2011/0023488 A1 | 2/2011 | Fong et al. | 60/659 |
| 2011/0027018 A1 | 2/2011 | Baker et al. | 405/128.6 |
| 2011/0219777 A1 | 9/2011 | Wijmans et al. | 60/772 |

FOREIGN PATENT DOCUMENTS

| | | | |
|---|---|---|---|
| CA | 2645450 | 9/2007 | |
| CA | 2614669 | 12/2008 | |
| EP | 0453059 | 6/1994 | |
| EP | 0488766 | 3/1995 | F23R 3/26 |
| EP | 0654639 | 9/1998 | |
| GB | 2117053 | 2/1983 | |
| GB | 2244551 A | * 12/1991 | |
| GB | 2397349 | 7/2004 | |
| JP | 06-054297 | 12/1916 | |
| JP | 04-260721 | 9/1992 | F23C 99/00 |
| WO | WO95/21683 | 8/1995 | |
| WO | WO97/07329 | 2/1997 | |
| WO | WO99/06674 | 2/1999 | |
| WO | WO99/63210 | 12/1999 | |
| WO | WO2005/064232 | 7/2005 | |
| WO | WO2006/107209 | 10/2006 | |
| WO | WO2007/068682 | 6/2007 | |
| WO | WO2008/074980 | 6/2008 | |
| WO | WO2008/097303 | 8/2008 | |
| WO | WO2008/155242 | 12/2008 | |
| WO | WO2009/120779 | 10/2009 | |
| WO | WO2009/121008 | 10/2009 | |
| WO | WO2009/155062 | 12/2009 | |
| WO | WO2010/044958 | 4/2010 | |
| WO | WO2010/066048 | 6/2010 | |
| WO | WO2010/141777 | 12/2010 | |
| WO | WO2011/028322 | 3/2011 | |
| WO | WO2011/028356 | 3/2011 | |
| WO | WO2012/003076 | 1/2012 | |
| WO | WO2012/003077 | 1/2012 | |
| WO | WO2012/003078 | 1/2012 | |
| WO | WO2012/003079 | 1/2012 | |
| WO | WO2012/003080 | 1/2012 | |
| WO | WO2012/003489 | 1/2012 | |
| WO | WO2012/018457 | 2/2012 | |
| WO | WO2012/018458 | 2/2012 | |

OTHER PUBLICATIONS

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.

Clark, Hal (2002) "Development of a Unique Gas Generator for a Non-Polluting Power Plant," *California Energy Commission Feasibility Analysis*, P500-02-011F, Mar. 2002, 42 pgs.

Defrate, L. A. et al. (1959) "Optimum Design of Ejector Using Digital Computers" *Chem. Eng. Prog. Symp. Ser.*, 55 ( 21) pp. 43-51.

Ditaranto, M. et al. (2006) "Combustion Instabilities in Sudden Expansion Oxy-Fuel Flames,"*ScienceDirect, Combustion and Flame*, v.146, Jun. 30, 2006, pp. 493-551.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Ertesvag, I. S. et al. (2005) "Exergy Analysis of a Gas-Turbin Combined-Cycle Power Plant With Precombustion $CO_2$ Capture," Elsivier, 2004, pp. 5-39.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE* 71749, 10 pgs.

Reeves, S. R. (2003) "Enhanced Coalbed Methane Recovery," *SPE* 101466-DL, 8 pgs.

Richards, G. A. et al. (2001) "Advanced Steam Generators," *National Energy Technology Laboratory*, 7 pgs.

(56) References Cited

OTHER PUBLICATIONS

Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium (Tuscaloosa, AL) Paper* 0615, 9 pgs.
Zhu, J. et al. (2002) "Recovery of Coalbed Methane by Gas Injection," *SPE* 75255, 15 pgs.

\* cited by examiner

100

400

500

900

1400

1500

SYSTEMS AND METHODS FOR OPTIMIZING STOICHIOMETRIC COMBUSTION

CROSS-REFERENCE TO RELATED APPLICATIONS

This application is the National Stage entry under 35 U.S.C. 371 of PCT/US2011/042000, that published as WO 2012/018457 and was filed on 27 Jun. 2011 which claims the benefit of U. S. Provisional Application No. 61/371,523, filed on 6 Aug. 2010, each of which is incorporated by reference, in its entirety, for all purposes.

FIELD

The present disclosure relates generally to low-emission power generation systems. More particularly, the present disclosure relates to systems and methods for optimizing substantially stoichiometric combustion in gas turbine systems.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The combustion of fuel within a combustor, e.g., integrated with a gas turbine, can be controlled by monitoring the temperature of the exhaust gas. At full load, typical gas turbines adjust the amount of fuel introduced to a number of combustors in order to reach a desired combustion gas or exhaust gas temperature. Conventional combustion turbines control the oxidant introduced to the combustors using inlet guide vanes. At partial load, the amount of oxidant introduced to the combustor is reduced and the amount of fuel introduced is again controlled to reach the desired exhaust gas temperature. At partial load, the efficiency of gas turbines drops because the ability to reduce the amount of oxidant is limited by the inlet guide vanes, which are only capable of slightly reducing the flow of oxidant. Further, the oxidant remains at a constant lower flow rate when the inlet guide vanes are in their flow restricting position. The efficiency of the gas turbine then drops when it is at lower power production because to make that amount of power with that mass flow a lower expander inlet temperature is required. Moreover, existing oxidant inlet control devices may not allow fine flow rate control and may introduce large pressure drops with any restriction on the oxidant flow. With either of these approaches to oxidant control, there are potential problems with lean blow out at partial load or reduced pressure operations.

Controlling the amount of oxidant introduced to the combustor can be desirable when an objective is to capture carbon dioxide ($CO_2$) from the exhaust gas. Current carbon dioxide capture technology is expensive due to several reasons. One reason is the low pressure and low concentration of carbon dioxide in the exhaust gas. The carbon dioxide concentration, however, can be significantly increased from about 4% to greater than 10% by operating the combustion process under substantially stoichiometric conditions. Further, a portion of the exhaust gas may be recycled to the combustor as a diluent in order to control the temperature of the exhaust gas. Also, any unused oxygen in the exhaust gas may be a contaminate in the captured carbon dioxide, restricting the type of solvents that can be utilized for the capture of carbon dioxide.

In many systems, an oxidant flow rate may be reduced by altering the operation of a separate oxidant system. For example, an independent oxidant compressor may be throttled back to a slower operating speed thereby providing a decreased oxidant flow rate. However, the reduction in compressor operating speed generally decreases the efficiency of the compressor. Additionally, throttling the compressor may reduce the pressure of the oxidant entering the combustor. In contrast, if the oxidant is provided by the compressor section of the gas turbine, reducing the speed is not a variable that is controllable during power generation. Gas turbines that are used to produce 60 cycle power are generally run at 3600 rpm. Similarly, to produce 50 cycle power the gas turbine is often run at 3000 rpm. In conventional gas turbine combustor operations the flow of oxidant into the combustor may not warrant significant control because the excess oxidant is used as coolant in the combustion chamber to control the combustion conditions and the temperature of the exhaust gas. A number of studies have been performed to determine techniques for controlling combustion processes in gas turbines.

For example, U.S. Pat. No. 6,332,313 to Willis, et al., discloses a combustion chamber with separate, valved air mixing passages for separate combustion zones. A combustion chamber assembly includes a primary, a secondary and a tertiary fuel and air mixing ducts to supply fuel and air to each of primary, secondary and tertiary combustion zones, respectively. Each of the primary, secondary and tertiary fuel and air mixing ducts includes a pair of axial flow swirlers, which are arranged coaxially to swirl the air in opposite directions and fuel injectors to supply fuel coaxially to the respective axial flow swirlers. Valves are provided to control the supply of air to the primary and the secondary fuel and air mixing ducts respectively. A duct is arranged to supply cooling air and dilution air to the combustion chamber. The amount of air supplied to the primary, secondary and tertiary fuel and air mixing ducts and the duct is measured.

International Patent Application Publication No. WO/2010/044958 by Mittricker, et al., discloses methods and systems for controlling the products of combustion, for example, in a gas turbine system. One embodiment includes a combustion control system having an oxygenation stream substantially comprising oxygen and $CO_2$ and having an oxygen to $CO_2$ ratio, then mixing the oxygenation stream with a combustion fuel stream and combusting in a combustor to generate a combustion products stream having a temperature and a composition detected by a temperature sensor and an oxygen analyzer, respectively. The data from the sensors are used to control the flow and composition of the oxygenation and combustion fuel streams. The system may also include a gas turbine with an expander and having a load and a load controller in a feedback arrangement.

International Patent Application Publication No. WO/2009/120779 by Mittricker, et al., discloses systems and methods for low emission power generation and hydrocarbon recovery. One system includes integrated pressure maintenance and miscible flood systems with low emission power generation. Another system provides for low emission power generation, carbon sequestration, enhanced oil recovery (EOR), or carbon dioxide sales using a hot gas expander and external combustor. Another system provides for low emission power generation using a gas power turbine to compress air in the inlet compressor and generate power using hot carbon dioxide laden gas in the expander.

U.S. Pat. No. 4,858,428 to Paul discloses an advanced integrated propulsion system with total optimized cycle for gas turbine. Paul discloses a gas turbine system with integrated high and low pressure circuits having a power transmission for extracting work from one of the circuits, the volume of air and fuel to the respective circuits being varied according to the power demand monitored by a microprocessor. The turbine system has a low pressure compressor and a staged high pressure compressor with a combustion chamber and high pressure turbine associated with the high pressure compressor. A combustion chamber and a low pressure turbine are associated with the low pressure compressor, the low pressure turbine being staged with the high pressure turbine to additionally receive gases expended from the high pressure turbine and a microprocessor to regulate air and gas flows between the compressor and turbine components in the turbine system.

U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust of the Brayton turbine. A portion of the exhaust gas is recirculated into the compressor inlet during part-load operation.

U.S. Patent Application Publication No. 2009/0064653 by Hagen, et al., discloses partial load combustion cycles. The part load method controls delivery of diluent fluid, fuel fluid, and oxidant fluid in thermodynamic cycles using diluent to increase the turbine inlet temperature and thermal efficiency in part load operation above that obtained by relevant art part load operation of Brayton cycles, fogged Brayton cycles, or cycles operating with some steam delivery, or with maximum steam delivery.

While some past efforts to control the oxidant flow rate have implemented oxidant inlet control devices, such systems disclosed a control of all of the combustors together, failing to account for differences between combustors. Further, the systems were limited in their ability to finely tune the oxidant flow rate.

SUMMARY

An exemplary embodiment of the present techniques provides a gas turbine system. The gas turbine system includes an oxidant system, a fuel system, a control system, and a plurality of combustors adapted to receive and combust an oxidant from the oxidant system and a fuel from the fuel system to produce an exhaust gas. An oxidant-flow adjustment device is operatively associated with each one of the combustors. The oxidant-flow adjustment device is configured to independently regulate an oxidant flow rate into the associated combustor. An exhaust sensor is in communication with the control system. The exhaust sensor is adapted to measure at least one parameter of the exhaust gas, and the control system is configured to independently adjust each of the plurality of oxidant-flow adjustment devices based, at least in part, on the parameter measured by the exhaust sensor.

The oxidant may include oxygen and a diluent. A diluent supply is provided to each of the plurality of combustors. An oxidant compressor may be used to provide compressed oxidant to the combustors.

The oxidant-flow adjustment device may include a flow control valve. The oxidant-flow adjustment device may include an adjustable swirler sub assembly. The adjustable swirler sub assembly may include an annular control assembly positioned around a flow sleeve to controllably regulate oxidant flow rates into the flow sleeve. The annular control assembly includes a plurality of articulating vanes operatively associated with a mounting ring and an actuator vane. The plurality of vanes is adapted to be controllably adjusted between an open position and a closed position and positions therebetween by moving the actuator vane relative to the mounting vane.

The gas turbine may include a plurality of exhaust sensors that are adapted to work with the control system to regulate oxidant flow rates to each of the plurality of combustors so as to minimize differences between measured parameters at different exhaust sensors. The oxidant-flow adjustment device on at least one of the plurality of combustors is adapted to increase mixing of the oxidant, the fuel, a diluent, or any combinations thereof.

A combustor may include a diluent inlet and an oxidant inlet, in which an oxidant-flow adjustment device is disposed in the oxidant inlet. The oxidant-flow adjustment device may be configured to mix the oxidant and the diluent before the fuel is introduced.

A turbine expander may be adapted to receive the exhaust gas and to generate power. A heat recovery steam generator may be adapted to receive the exhaust gas from the turbine expander and to generate power. A diluent compressor and an exhaust gas recirculation loop may be adapted to receive the exhaust gas from the expander, in which the exhaust gas recirculation loop includes a heat recovery steam generator adapted to generate power, and a cooled exhaust line can be adapted to provide cooled exhaust gas to the diluent compressor, and in which the diluent compressor is adapted to provide compressed diluent to the combustor.

An exhaust gas extraction system may be disposed between the diluent compressor and the combustor, wherein the exhaust gas extraction system may extract diluent at elevated pressures.

Another exemplary embodiment provides a method of controlling a gas turbine. The method includes providing a fuel to a plurality of combustors on a gas turbine, and providing an oxidant to the plurality of combustors, wherein an oxidant flow rate is independently adjusted for each of the plurality of combustors. The fuel and the oxidant are combusted in the plurality of combustors to produce an exhaust gas. A parameter of the exhaust gas is measured and the oxidant flow rate into each of the plurality of combustors is adjusted to control the parameter to within a target set-point range.

The method may include compressing the oxidant before the oxidant is provided to each of the plurality of combustors. A portion of the exhaust gas may be returned to the plurality of combustors as a diluent. The diluent may be compressed with a compressor before the diluent enters the combustor. The compressor may be operatively coupled to an expander adapted to receive the exhaust gas and to generate power therefrom.

At least a portion of the exhaust gas may be extracted from a coupling disposed between the compressor and each of the plurality of combustors, wherein the amount of exhaust gas extracted is based, at least in part, on the parameter.

Another exemplary embodiment provides a non-transitory computer readable medium comprising code configured to direct a processor to provide a fuel to a plurality of combustors on a gas turbine and provide an oxidant to the plurality of combustors, wherein an oxidant flow rate is independently adjusted for each of the plurality of combustors. The code also directs the processor to monitor a parameter of an exhaust gas produced in a flame in the combustors and adjust the oxidant flow rate into each of the plurality of combustors to control the parameter to within a target set-point range. The parameter may be a concentration of oxygen in the exhaust gas. The parameter may be a concentration of carbon monoxide in the exhaust gas.

The non-transitory computer readable medium may include a data structure representing a swirl chart. The code may be configured to direct the processor to compare measurements associated with a plurality of sensors to the data structure to determine which of the plurality of combustors to adjust. The code may be configured to direct the processor to obtain measurements from a plurality of exhaust sensors. The code may be configured to direct the processor to regulate oxidant flow rates to each of the plurality of combustors so as to minimize differences between measured parameters at different exhaust sensors.

DESCRIPTION OF THE DRAWINGS

The advantages of the present techniques are better understood by referring to the following detailed description and the attached drawings, in which.

DETAILED DESCRIPTION

Figure 1:
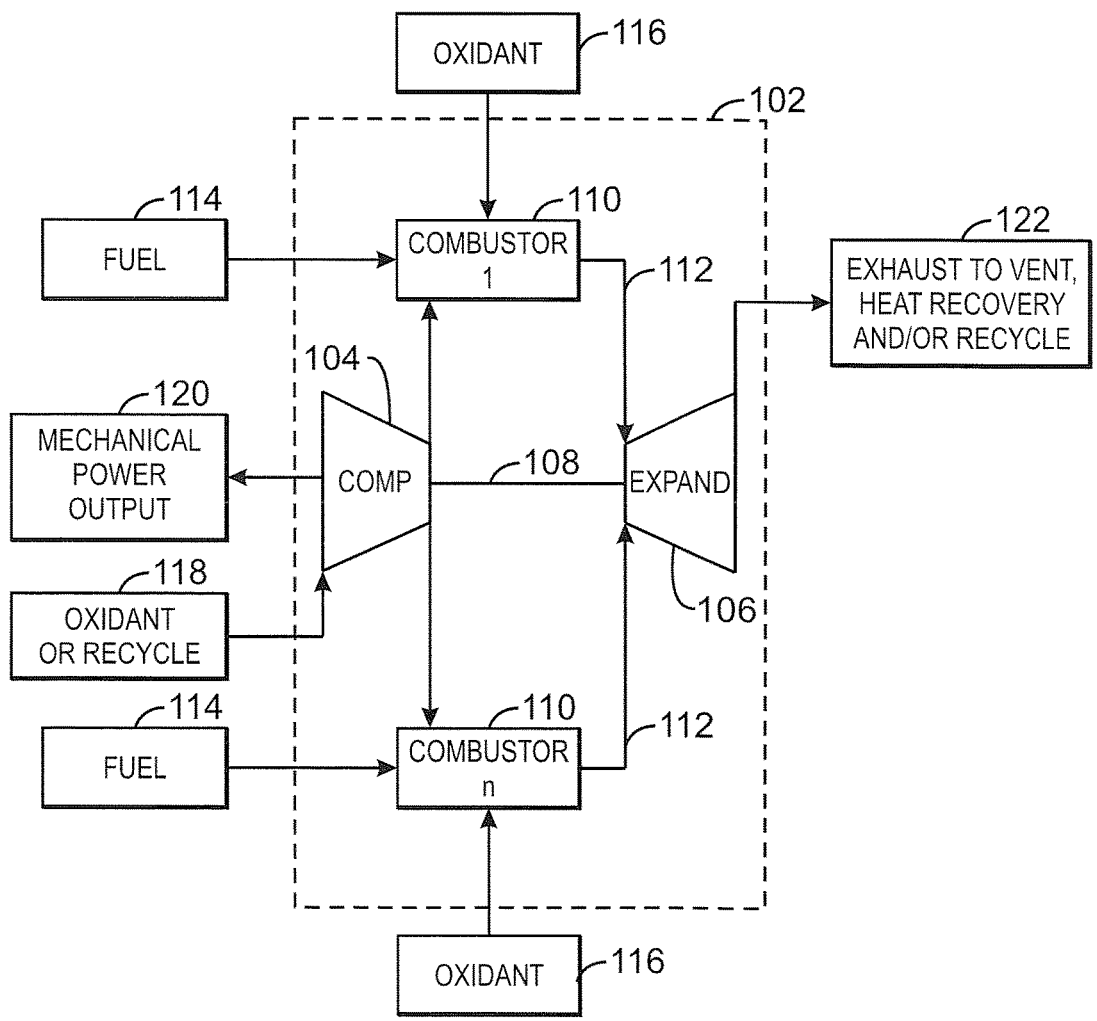
FIG. 1 is a schematic diagram of a gas turbine system that includes a gas turbine.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

An "adsorbent" may be used to extract or sequester $CO_2$ from an exhaust gas flow. The absorbent may be used in a series of parallel beds, which can be switched when an absorbent in a bed has reached capacity. The bed that is removed from the flow can then be treated, such as heated, to desorb the $CO_2$.

Suitable adsorbents for $CO_2$ sequestration in the present applications have reasonably large working capacity over the relevant temperature range and composition range, good selectivity for $CO_2$ over other undesired constituents (such as $N_2$ and $O_2$), good kinetics, high durability, good compatibility, and reasonably low cost. Several solid phase adsorbents are potential candidates for $CO_2$ capture. For example, molecular sieves are materials whose atoms are arranged in a lattice or framework in such a way that a large number of interconnected uniformly sized pores exist. The pores generally only admit molecules of a size about equal to or smaller than that of the pores. Molecular sieves, thus, can be used to adsorb and separate or screen molecules based on their size with respect to the pores. One class of molecular sieves is zeolites. Zeolites are hydrated silicates of aluminum and frequently contain cations, which are exchangeable. Zeolites can be naturally occurring or artificial. Naturally occurring types include chabazite, clinoptilolite, erionite, heulandite, and mordenite, to name but a few. Artificial zeolites including, for example, types A, D, L, R, S, T, X, Y, ZSM, mordenite, or clinoptilolite, may also be used. Liquid phase, or solvent adsorption systems, such as those based on chemisorption, may also be used. These may include systems based on carbonates, or amines, among others.

"Physical absorption" means absorbing a product, such as carbon dioxide, from a gaseous feed stream by passing the feed stream into a liquid which preferentially adsorbs the product from the feed stream at a relatively high pressure, for example, about 2.07 to 13.8 MPa. The feed stream that is depleted of the absorbed product is removed from the liquid. The product can then be recovered from the liquid such as by lowering the pressure over the liquid or by stripping the product out of the liquid. Unlike other solvent based processes, such as those based on amines or carbonates, the absorption of the carbon dioxide into the liquid does not involve a chemical reaction of the carbon dioxide. An example of a physical adsorption process is the SEL-EXOL™ process available from the UOP LLC subsidiary of the HONEYWELL Corporation.

A "carbon sequestration facility" is a facility in which carbon dioxide can be controlled and sequestered in a repository such as, for example, by introduction into a mature or depleted oil and gas reservoir, an unmineable coal seam, a deep saline formation, a basalt formation, a shale formation, or an excavated tunnel or cavern. Further, sequestration can be combined with other uses for the sequestered gas, such as increasing hydrocarbon production in tertiary oil recovery from an active reservoir.

A "combined cycle power plant" uses both steam and gas turbines to generate power. The gas turbine operates in an open Brayton cycle, and the steam turbine operates in a Rankine cycle powered by the heat from the gas turbine. These combined cycle gas/steam power plants generally have a higher energy conversion efficiency than gas or steam only plants. A combined cycle plant's efficiencies can be as high as 50% to 60%. The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

A diluent is a gas used to lower the concentration of oxidant fed to a gas turbine to combust a fuel. The diluent may be an excess of nitrogen, $CO_2$, combustion exhaust, or any number of other gases. In embodiments, a diluent may also provide cooling to a combustor.

As used herein, a "compressor" includes any type of equipment designed to increase the pressure of a working fluid, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail below.

A "control system" typically comprises one or more physical system components employing logic circuits that cooperate to achieve a set of common process results. In an operation of a gas turbine engine, the objectives can be to achieve a particular exhaust composition and temperature. The control system can be designed to reliably control the physical system components in the presence of external disturbances, variations among physical components due to manufacturing tolerances, and changes in inputted set-point values for controlled output values. Control systems usually have at least one measuring device, which provides a reading of a process variable, which can be fed to a controller, which then can provide a control signal to an actuator, which then drives a final control element acting on, for example, an oxidant stream. The control system can be designed to remain stable and avoid oscillations within a range of specific operating conditions. A well-designed control system can significantly reduce the need for human intervention, even during upset conditions in an operating process.

An "equivalence ratio" refers to the mass ratio of fuel to oxygen entering a combustor divided by the mass ratio of fuel to oxygen when the ratio is stoichiometric. A perfect combustion of fuel and oxygen to form $CO_2$ and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons.

A "gas turbine" engine operates on the Brayton cycle. If the exhaust gas is vented, this is termed an open Brayton cycle, while recycling of the exhaust gas gives a closed Brayton cycle. As used herein, a gas turbine typically includes a compressor section, a number of combustors, and a turbine expander section. The compressor may be used to compress an oxidant, which is mixed with a fuel and channeled to the combustors. The mixture of fuel and oxidant is then ignited to generate hot combustion gases. The combustion gases are channeled to the turbine expander section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat recovery steam generator" or HRSG is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

An "oxidant" is a gas mixture that can be flowed into the combustors of a gas turbine engine to combust a fuel. As used herein, the oxidant may be oxygen mixed with any number of other gases as diluents, including $CO_2$, $N_2$, air, combustion exhaust, and the like.

A "sensor" refers to any device that can detect, determine, monitor, record, or otherwise sense the absolute value of or a change in a physical quantity. A sensor as described herein can be used to measure physical quantities including, temperature, pressure, $O_2$ concentration, CO concentration, $CO_2$ concentration, flow rate, acoustic data, vibration data, chemical concentration, valve positions, or any other physical data.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments of the present invention provide a system and a method for individually controlling a number of combustors on a gas turbine engine. The control may be based, at least in part, on measurements from sensors, for example, located in a ring on an exhaust expander. The sensors may include oxygen sensors, carbon monoxide sensors, and temperature sensors, among others. Further, combinations of different types of sensors may be used to provide further information.

The sensors may not have a one-to-one relationship to particular combustors, but may be influenced by a particular combustor. The response of various sensors may be related back to a particular combustor, for example, using sum and difference algorithms that may be based on swirl charts. Swirl charts relate patterns of exhaust flow in an expander to combustors that may have contributed to the exhaust flow at that point.

The use of individually controlled combustors may increase the burn efficiency of a gas turbine engine, e.g., making the burn closer to a one-to-one equivalence ratio. Such improvements in efficiency may lower $O_2$ and unburned hydrocarbons in the exhaust and make capturing $CO_2$ from the exhaust gas more efficient. This may improve the capture of the $CO_2$ from the turbine for use in enhanced oil recovery, as well as in sequestration.

FIG. 1 is a schematic diagram of a gas turbine system 100 that includes a gas turbine 102. The gas turbine 102 may have a compressor 104 and a turbine expander 106 on a single shaft 108. The gas turbine 102 is not limited to a single shaft arrangement, as multiple shafts could be used, generally with mechanical linkages or transmissions between shafts. In embodiments, the gas turbine 102 also has a number of combustors 110 that feed hot exhaust gas to the expander, for example, through lines 112. For example, a gas turbine 102 may have 2, 4, 6, 14, 18, or even more combustors 110, depending on the size of the gas turbine 102.

The combustors 110 are used to burn a fuel provided by a fuel source 114. An oxidant may be provided to each of the combustors 110 from various sources. For example, in embodiments, an external oxidant source 116, such as an external compressor, may provide the oxidant to the combustors 110. In embodiments, an oxidant or recycled exhaust gases 118, or a mixture thereof, may be compressed in the compressor 104 and then provided to the combustors 110. In other embodiments, such as when an external oxidant source 116 is provided, the compressor 104 may be used to compress only the recycled exhaust gas, which may be fed to the combustors 110 for cooling and dilution of the oxidant.

The exhaust gas from the combustors 110 expands in the turbine expander 106, creating mechanical energy. The mechanical energy may power the compressor 104 through the shaft 108. Further, a portion of the mechanical energy may be harvested from the gas turbine as a mechanical power output 120, for example, to generate electricity or to power oxidant compressors. The expanded exhaust gas 122 may be vented, used for heat recovery, recycled to the compressor 104, or used in any combinations thereof.

In embodiments, the oxidant can be individually metered to each of the combustors 110 to control an equivalence ratio in that combustor 110. It will be apparent to one of skill in the art that a stoichiometric burn, e.g., at an equivalence ratio of 1, will be hotter than a non-stoichiometric burn. Therefore, either excess oxidant or an added non-combustible gas, such as a recycle exhaust gas, can be added to cool the engine, preventing damage to the combustors 110 or the turbine expander 106 from the extreme heat. The use of recycled exhaust gas 122 provides a further advantage in that the exhaust is deficient in oxygen, making it a better material for enhanced oil recovery. Further, individually adjusting the oxidant to each combustor 110, for example, as discussed with respect to FIGS. 2 and 3, may compensate for differences between the combustors 110, improving the overall efficiency of the gas turbine 102. Control of the mixture parameters to each of the combustors 110 is discussed further with respect to FIGS. 13A, 13B, and 14.

Figure 2:
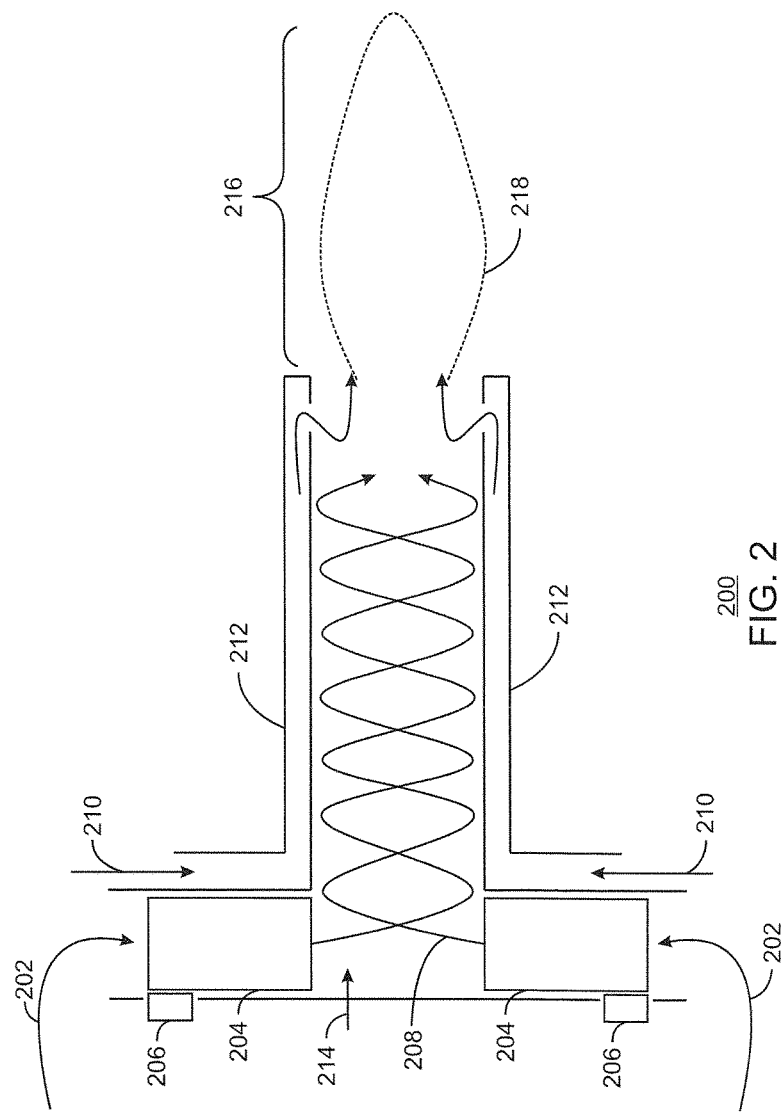
FIG. 2 is a diagram illustrating a portion of a combustor, such as the combustors discussed with respect to FIG. 1.

FIG. 2 is a diagram 200 illustrating a portion of a combustor, such as the combustors 110 discussed with respect to FIG. 1. It will be clear that this is merely one example of a combustor 110, as many other options are available. As shown in the diagram 200, an oxidant 202 may be fed into an adjustable oxidant swirler 204. The swirler 204 may be more widely opened or partially closed by moving an actuator ring 206, as discussed further with respect to FIG. 3. The swirler 204 creates a spiraling gas flow 208 of that may enhance mixing, for example, of air with recycled exhaust gas in an oxidant flow, or an oxidant with fuel. Fuel 210 may be injected through a separate flow path 212, for example, along the outside of the spiraling gas 208, which may heat the fuel 210, enhancing the burn.

Injection of the fuel 210 is not limited to a separate flow path 212, as the fuel 210 may be injected in any number of places. For example, a preheated stream of fuel 214 may be injected down the center of the swirler 204, mixing with the oxidant 202 in the spiral flow path 208. The fuel 210 is mixed with the oxidant 202 prior to entering a combustion zone 216, in which the fuel 210 and oxidant 202 are consumed in a flame 218. The adiabatic flame temperature of a stoichiometric combustion of methane in air is about 1960° C. and a stoichiometric combustion of methane in oxygen is about 2800° C.). Accordingly, cooling may be needed to decrease the chance of damage to the equipment. Thus, in embodiments, a diluent may be added to oxidant 202 for cooling purposes as it is injected into the adjustable oxidant swirler 204. In embodiments, the diluent may be recycled exhaust gas, nitrogen, or other gases that do not participate in the combustion process.

Figure 3:
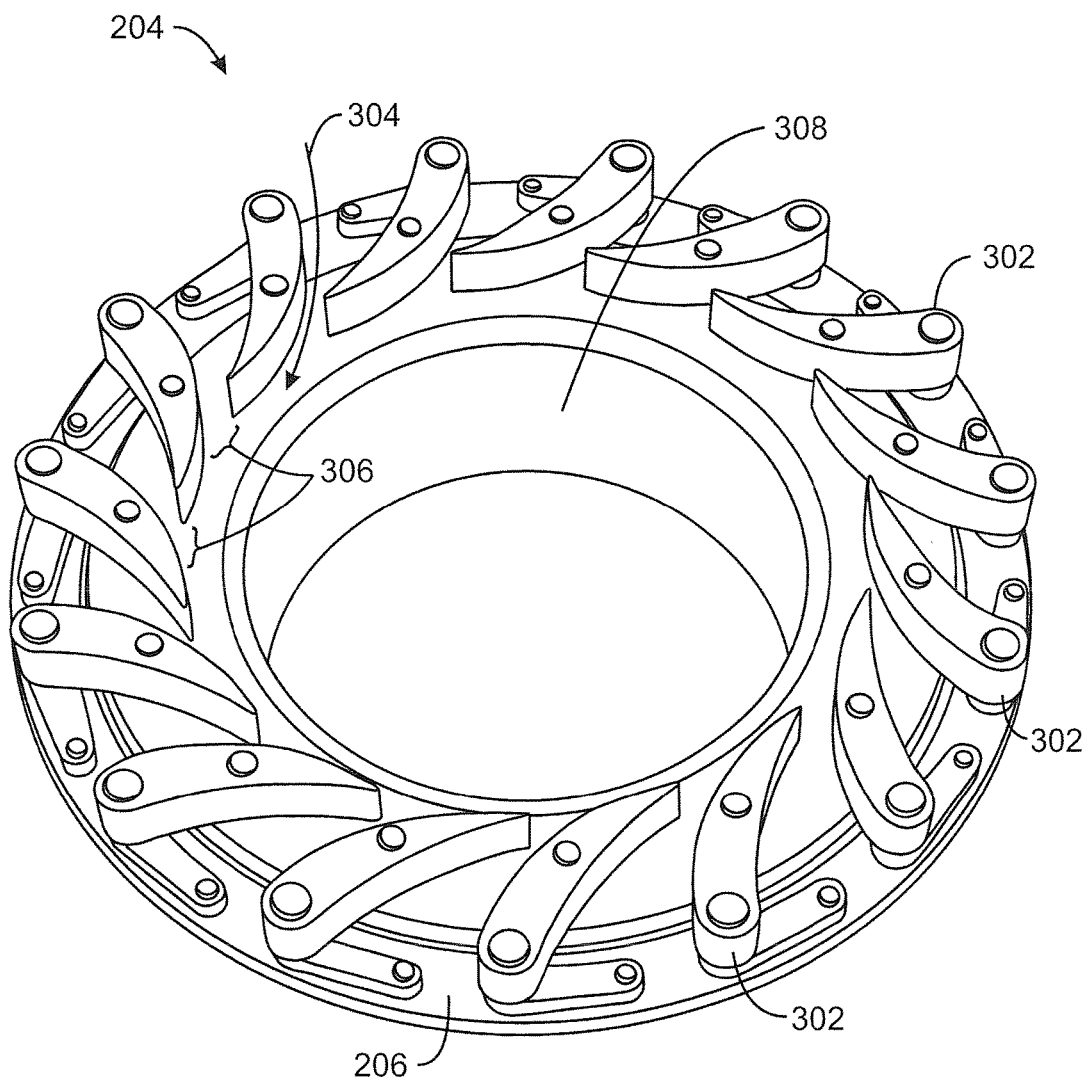
FIG. 3 is a drawing of a swirler, as discussed with respect to FIG. 2.

FIG. 3 is a drawing of a swirler 204, as discussed with respect to FIG. 2. The swirler 204 has a number of vanes 302 that direct an oxidant flow 304 through a throat opening 306 between each of the vanes 302. An actuator ring 206 can be used to adjust the size of the throat openings 306. For example, when the actuator ring changes angle, the vanes 302 can open or close, adjusting the oxidant flow 304 into the throat 308. An adjustable swirler 204 may be included in each combustor 110 (FIG. 1) to modify the oxidant amount fed to the combustor 110. A system that may use a swirler 204 to adjust the amount of oxidant to each combustor 110 is shown in FIG. 4.

Individual Control of Oxidant to Combustors

Figure 4:
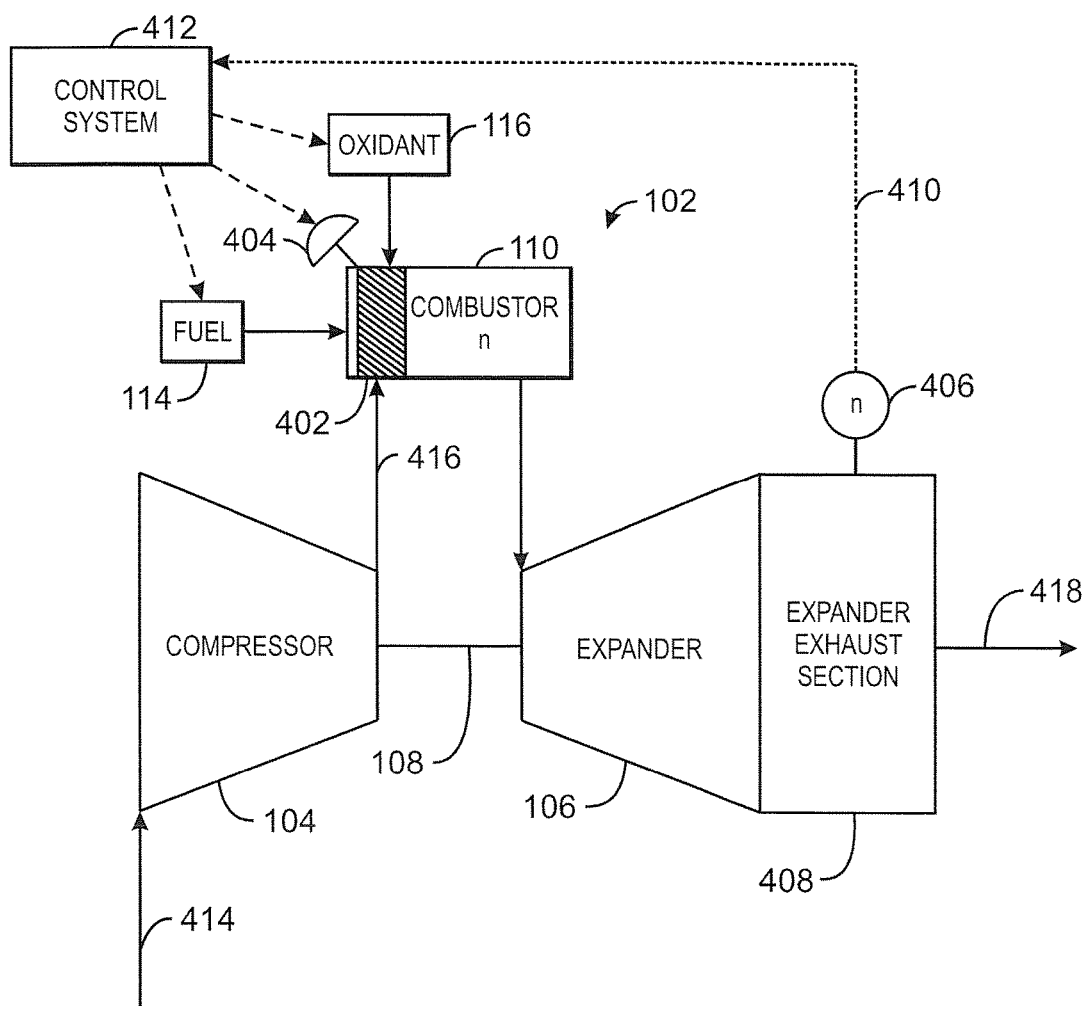
FIG. 4 is a schematic of a gas turbine system that can be used to individually adjust the oxidant flow to each of a number of combustors.

FIG. 4 is a schematic of a gas turbine system 400 that can be used to individually adjust the oxidant flow to each of a number of combustors 110. The referenced units are as generally discussed with respect to FIG. 1. The system 400 uses an oxidant flow adjusting device 402, such as the swirler 204 discussed above, and a mixing section in each combustor 110. An actuator 404 can be used to adjust the oxidant flow adjusting device 402.

A number of sensors 406 can be placed in an expander exhaust section 408 of the gas turbine 102, for example, 5, 10, 15, 20, 25, 30 or more, sensors 406 may be placed in a ring around the expander exhaust section 408. The number of sensors 406 may be determined by the size of the gas turbine 102. The sensors 406 may be any of the types discussed herein, including oxygen sensors, carbon monoxide sensors, temperature sensors, and the like. Examples of oxygen sensors can include lambda and/or wideband zirconia oxygen sensors, titania sensors, galvanic, infrared, or any combination thereof. Examples of temperature sensors can include thermocouples, resistive temperature devices, infrared sensors, or any combination thereof. Examples of carbon monoxide sensors can include oxide based film sensors such as barium stannate and/or titanium dioxide. For example, a carbon monoxide sensor can include platinum-activated titanium dioxide, lanthanum stabilized titanium dioxide, and the like. The choice of the sensors 406 may be controlled by the response time, as the measurements are needed for real time control of the system. The sensors 406 may also include combinations of different types of sensors 406. The sensors 406 send a data signal 410 to a control system 412.

The control system 412 may be part of a larger system, such as a distributed control system (DCS), a programmable logic controller (PLC), a direct digital controller (DDC), or any other appropriate control system. Further, the control system 412 may automatically adjust parameters, or may provide information about the gas turbine 102 to an operator who manually performs adjustments. The control system 412 is discussed further with respect to FIG. 14, below.

It will be understood that the gas turbine system 400 shown in FIG. 4, and similar gas turbine systems depicted in other figures, have been simplified to assist in explaining various embodiments of the present techniques. Accordingly, in embodiments of the present techniques, both the oxidant system 116 and the fuel system 114, as well as the gas turbine systems themselves, can include numerous devices not shown. Such devices can include flow meters, such as orifice flow meters, mass flow meters, ultrasonic flow meters, venturi flow meters, and the like. Other devices can include valves, such as piston motor valves (PMVs) to open and close lines, and motor valves, such as diaphragm motor valves (DMVs), globe valves, and the like, to regulate flow rates. Further, compressors, tanks, heat exchangers, and sensors may be utilized in embodiments in addition to the units shown.

In the embodiment shown in FIG. 4, the compressor 104 may be used to compress a stream 414, such as a recycled exhaust stream. After compression, the stream 414 may be injected from a line 416 into the mixing section of the combustor 110. The stream 414 is not limited to a pure recycle stream, as the injected stream 416 may provide the oxidant to the combustor 110. The exhaust stream 418 from the expander exhaust section 408 may be used to provide the recycle stream, as discussed further with respect to FIG. 12, below. The sensors 406 are not limited to the expander exhaust section 408, but may be in any number of other locations. For example, the sensors 406 may be disposed in multiple rings around the expander exhaust section 408. Further, the sensors 406 may be separated into multiple rings by the type of sensor 406, for example, with oxygen analyzers in one ring and temperature sensors in another ring. It will be apparent to one of skill in the art that any number of appropriate arrangements may be used. In addition to, or in place of, sensors 406 in the exhaust expander, sensors may also be disposed in other parts of the gas turbine 102, as discussed with respect to FIGS. 5 and 6.

Figure 5:
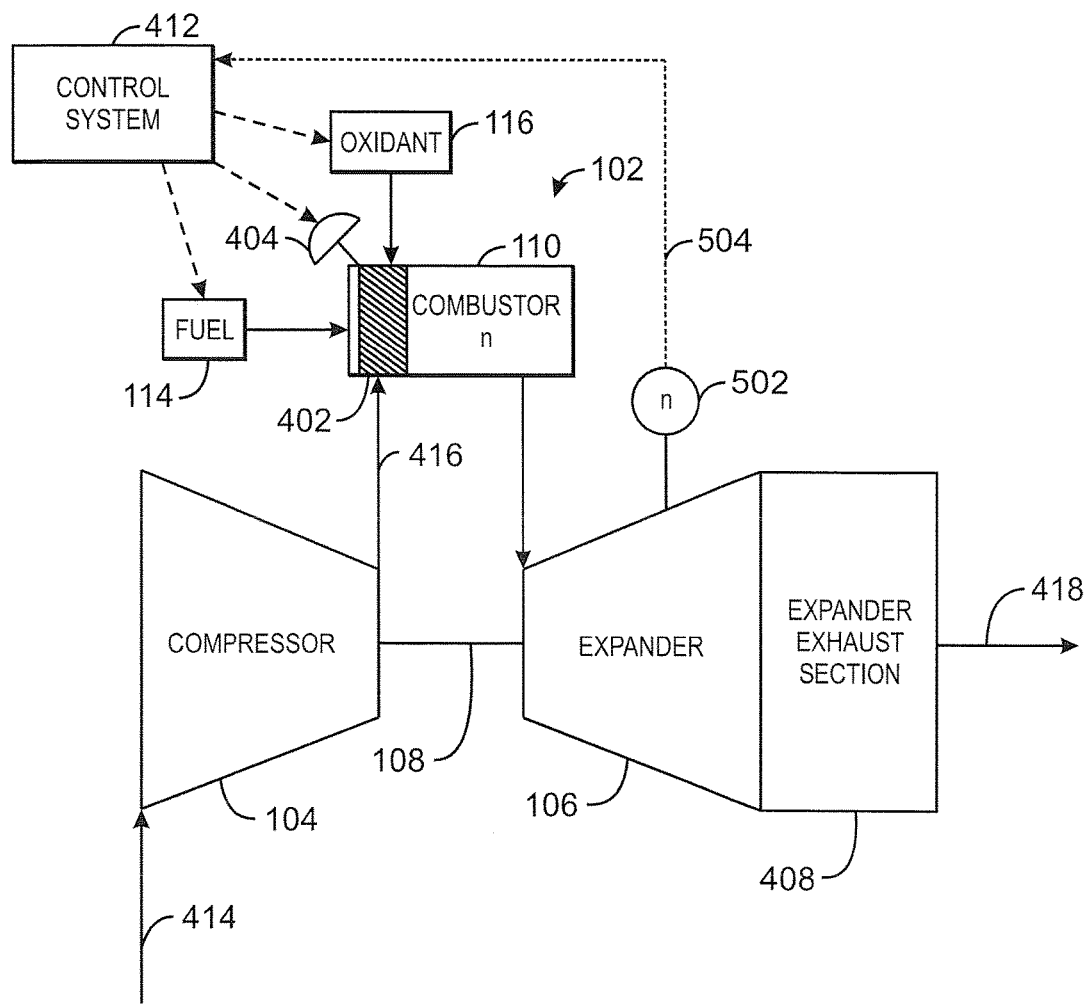
FIG. 5 is a schematic of a gas turbine system that includes sensors on the turbine expander.

FIG. 5 is a schematic of a gas turbine system 500 that includes sensors 502 on the turbine expander 106. The referenced units are as described above with respect to FIGS. 1 and 4. The sensors 502 on the turbine expander 106 send a signal 504 back to the control system 412, which may be used to make adjustment decisions for each, or all, of the combustors 110. Any number of physical measurements could be performed on the expander 106, for example, the sensors 106 could be used to measure temperature, pressure, CO concentration, $O_2$ concentration, vibration, and the like. Further, multiple sensors 502 could be used to measure combinations of these parameters. Placing sensors 502 on the turbine expander 106 may increase the dependency of each of the sensors 502 on conditions in individual combustors 106, improving the efficiency of control algorithms. This may be further enhanced, as discussed with respect to FIG. 6.

Figure 6:
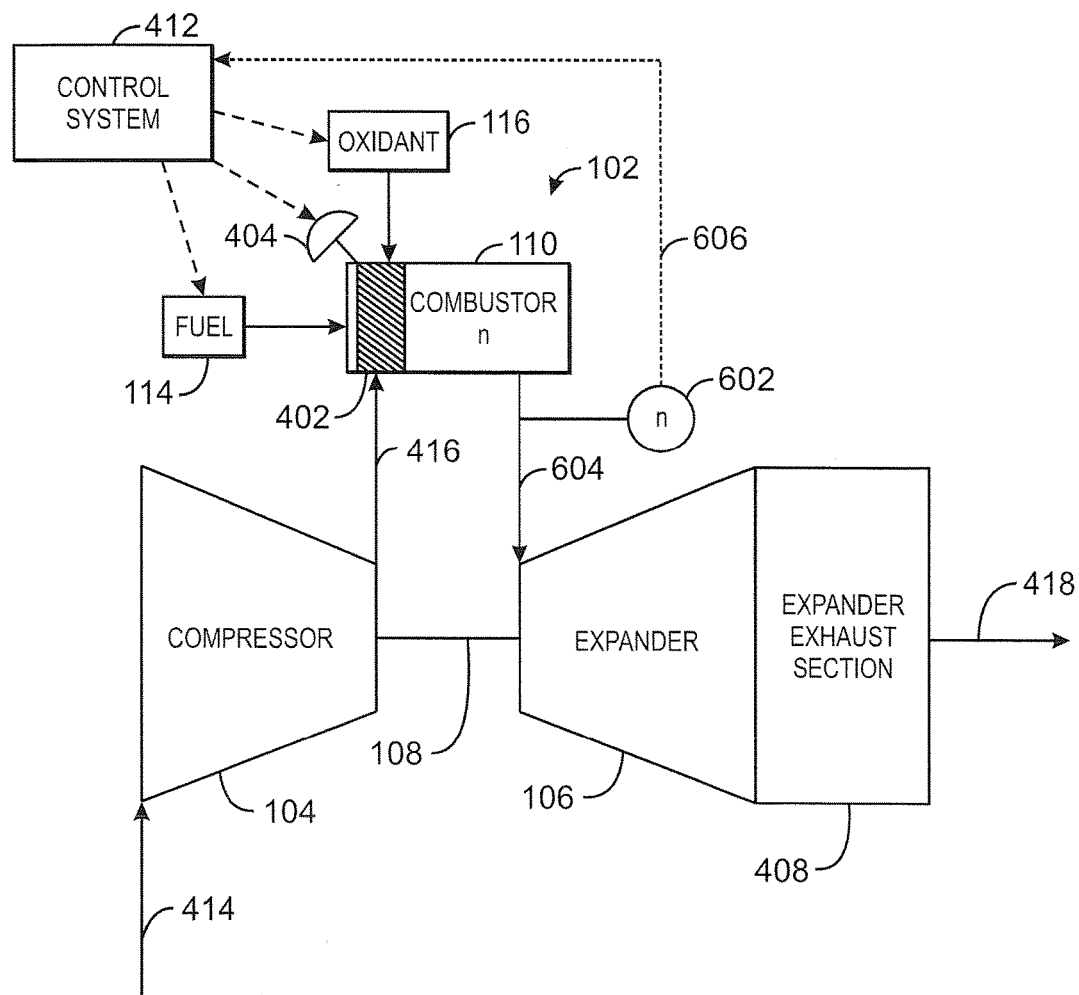
FIG. 6 is a schematic of a gas turbine system that includes sensors on the exhaust line out of each combustor.

FIG. 6 is a schematic of a gas turbine system 600 that includes sensors 602 on the exhaust line 604 out of each combustor 110. The referenced units are as described above with respect to FIGS. 1 and 4. In this embodiment, a signal 606 returned to the control system 412 from the sensor 602 that is specific to the individual combustor 110, enabling specific control algorithms to be implements in the control system 412 for each of the combustors 110. As discussed previously, the sensor 602 may measure temperature, pressure, CO concentration, $O_2$ concentration, or any combinations thereof. This arrangement of sensors 602 may be combined with sensors 406 placed in the expander exhaust section 408, or in other locations, to provide data for both specific control of each of the combustors 110 and overall control data for the gas turbine 102. Other techniques may also be used in embodiments to gain further control over the combustion process in each of the combustors 110, as discussed with respect to FIG. 7.

Figure 7:
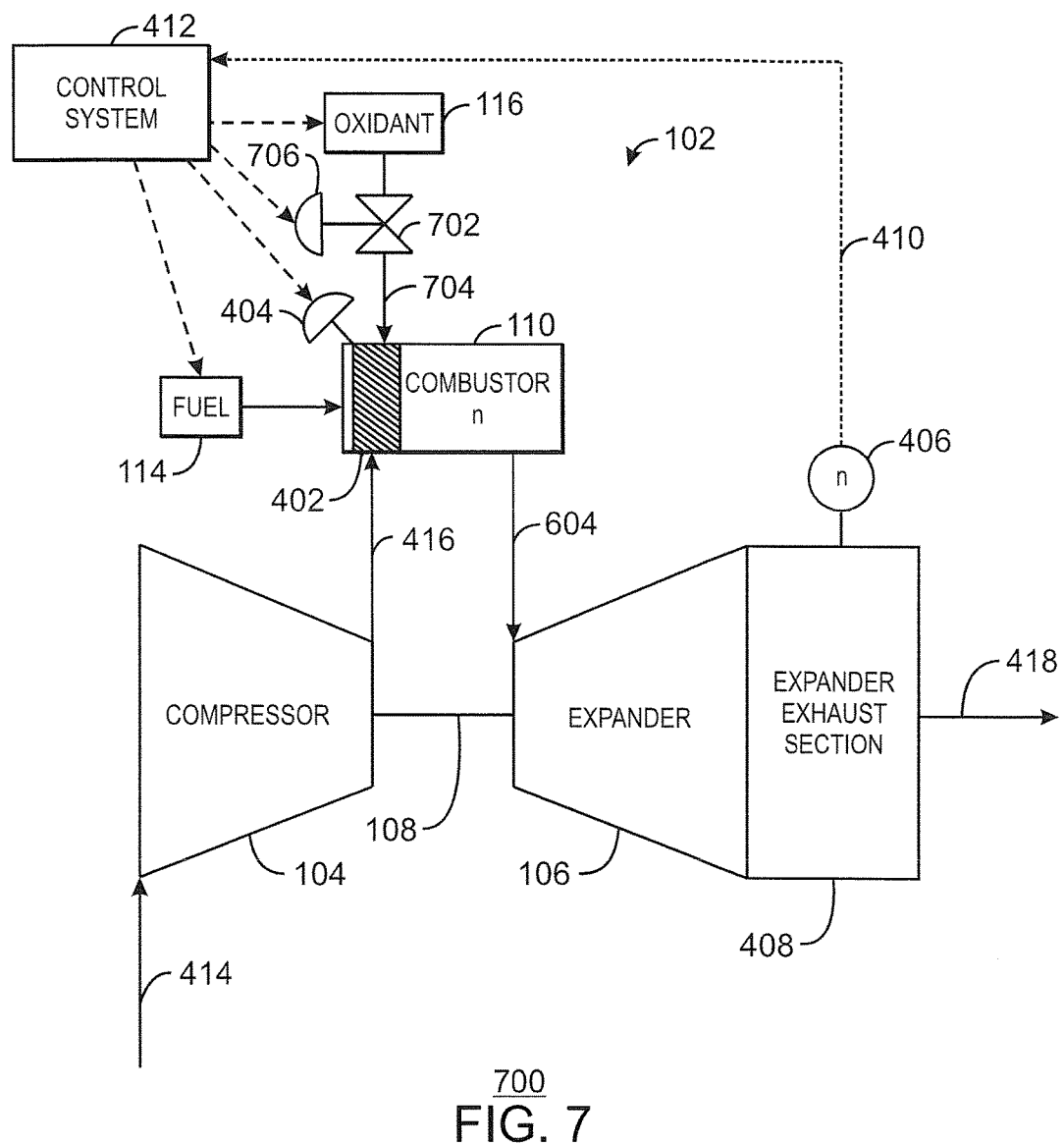
FIG. 7 is a schematic of a gas turbine system that includes a separate oxidant flow adjusting valve on the oxidant supply line for each combustor.

FIG. 7 is a schematic of a gas turbine system 700 that includes a separate oxidant flow adjusting valve 702 on the oxidant supply line 704 for each combustor 110. As used herein, the oxidant flow adjusting valve 702 can be any variable geometry system designed to control the flow of a gas through a line. The referenced units are as described above with respect to FIGS. 1, 4, and 6. An actuator 706 can be used by the control system 412 to adjust the flow rate of oxidant through the oxidant flow adjusting valve 702. The oxidant flow adjusting valve 702 may operate together with the oxidant flow adjusting device 402 to regulate oxidant flow, providing a closer control of the combustion process in the combustor 110. Further, in embodiments, an oxidant flow adjusting valve 702 may be combined with a sensor 602 (FIG. 6) on the exhaust line 604 from the combustor 110 to provide further control.

In embodiments the gas turbines 102 may be used to provide power, $CO_2$, heat energy, or any combinations thereof for numerous applications. For example, the heat from the exhaust may be recovered as discussed with respect to FIG. 8.

Energy Recovery and Recycle of Exhaust

Figure 8:
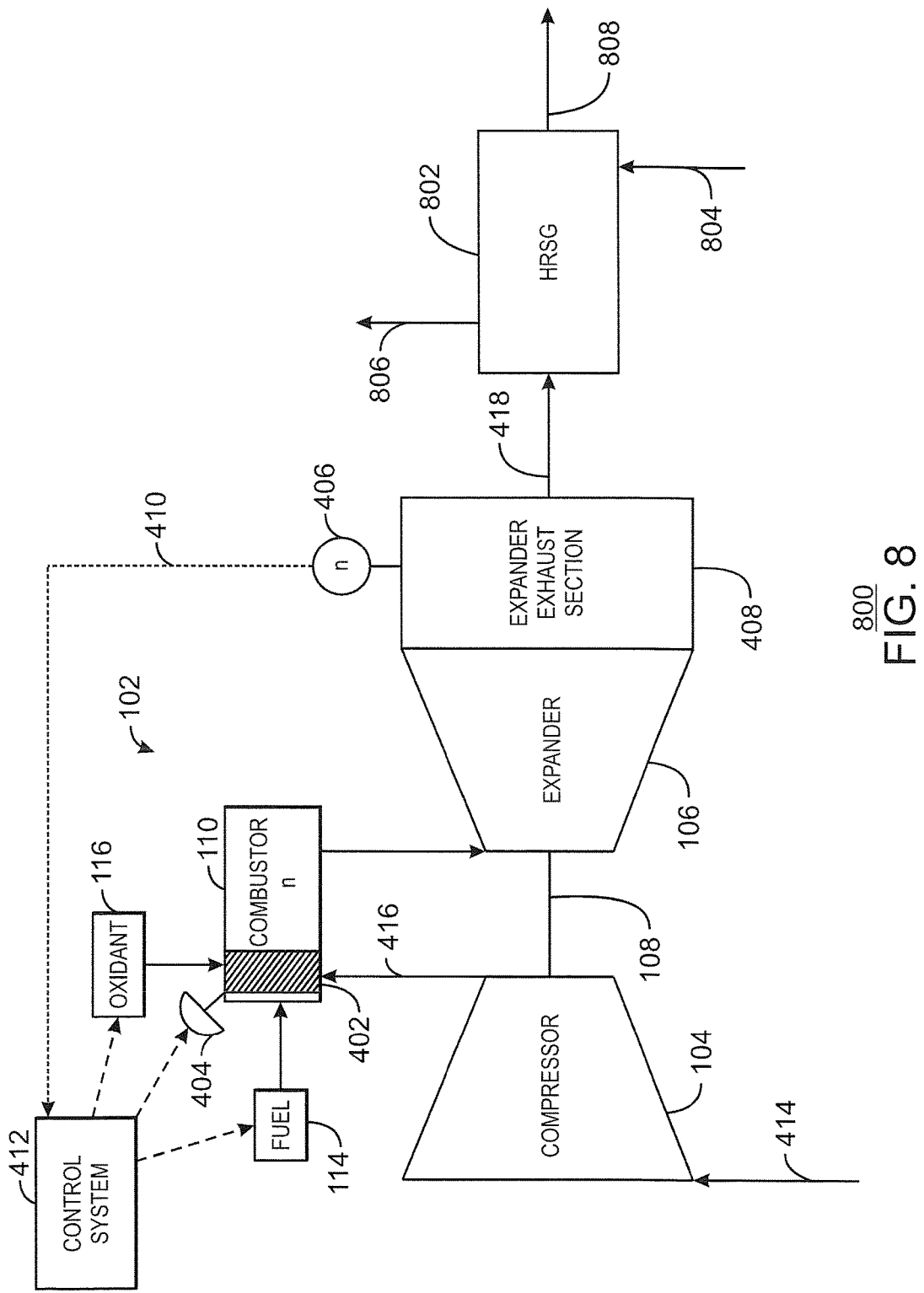
FIG. 8 is a schematic of a gas turbine system that includes a heat recovery steam generator (HRSG) on the exhaust stream from the expander exhaust section.

FIG. 8 is a schematic of a gas turbine system 800 that includes a heat recovery steam generator (HRSG) 802 on the exhaust stream 418 from the expander exhaust section 408. The referenced units are as described above with respect to FIGS. 1 and 4. The exhaust gas in the exhaust stream 418 can include, but is not limited to, fuel, oxygen, carbon monoxide, carbon dioxide, hydrogen, nitrogen, nitrogen oxides, argon, water, steam, or any combination thereof. The exhaust stream 418 can have a temperature ranging from about 430° C. to about 725° C. and a pressure of about 101 kPa to about 110 kPa.

In the embodiment shown in the schematic 800, the heat generated by the combustion can be used to boil an inlet water stream 804 to generate a steam stream 806 that may also be superheated. The steam stream 806 may be used, for example in a Rankine cycle to generate mechanical power from a steam turbine, or to provide steam for utilities, or both. The mechanical power from the steam turbine may be used to generate electricity, operate compressors, and the like. The system 800 is not limited to a HRSG 802, as any type of heat recovery unit (HRU) may be used. For example, the heat may be recovered in a heat exchanger to provide hot water or other heated fluids. Further, a Rankine cycle based on an organic working fluid (ORC) may be used to recover heat energy by converting it to mechanical energy.

The cooled exhaust stream 808 may then be used for other purposes, such as to provide recycled exhaust for stream 414, as discussed below. Various sensors may be added to the system to monitor and control the steam generation process, as discussed with respect to FIGS. 9 and 10.

Figure 9:
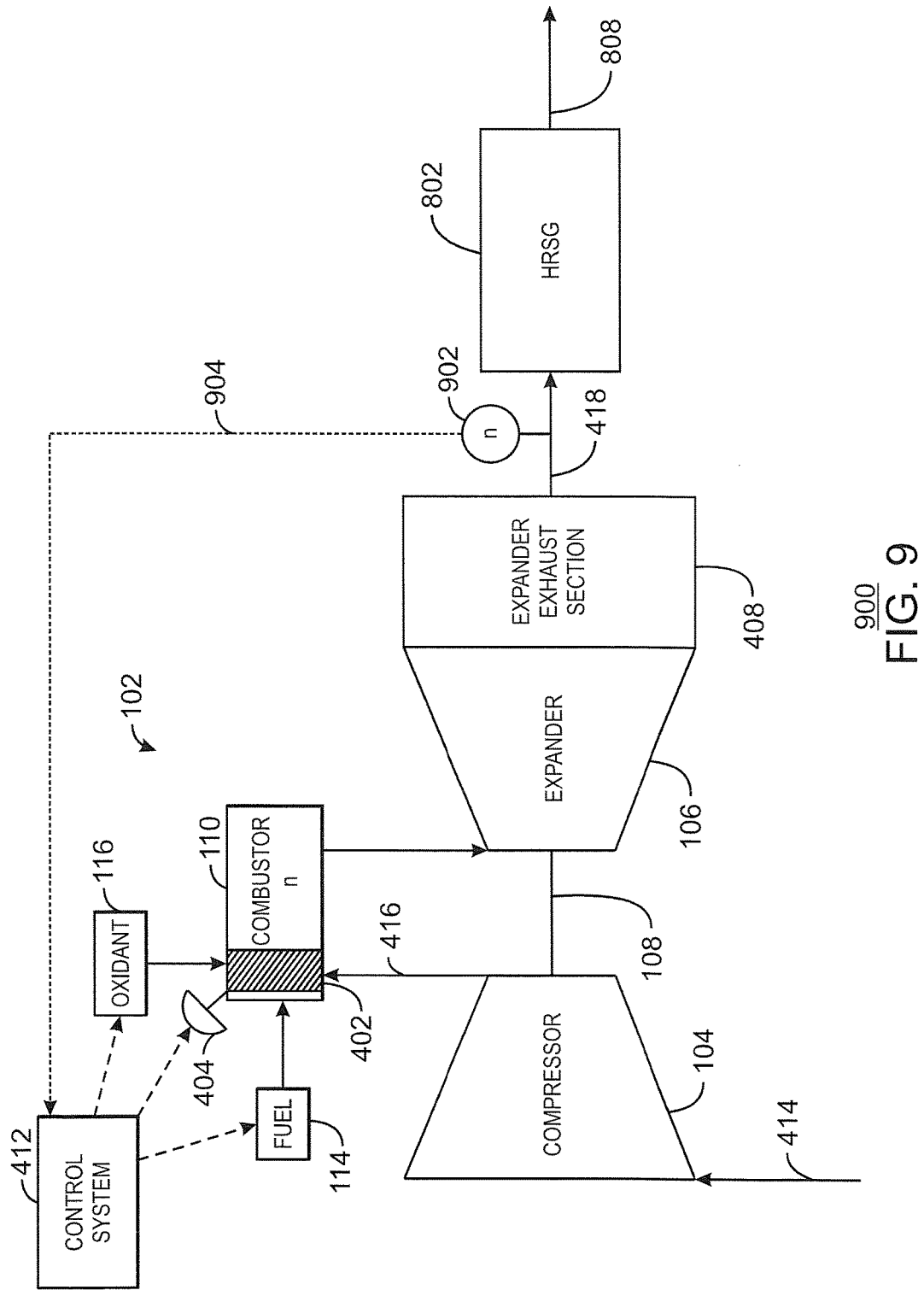
FIG. 9 is a schematic of a gas turbine system that includes a sensor on the exhaust stream from the expander exhaust section to a heat recovery steam generator (HRSG)

FIG. 9 is a schematic of a gas turbine system 900 that includes a sensor 902 on the exhaust stream 418 from the expander exhaust section 408 to a heat recovery steam generator (HRSG) 802. The referenced units are as described above with respect to FIGS. 1, 4, and 8. A signal 904 is provided from the sensor 902 to the control system 412. The sensor 902 may be a temperature sensor, a pressure sensor, or any of the sensors discussed previously. Further, the sensor 902 may be a single sensor or a group of sensors, and may be configured to provide information for controlling all of the combustors 110 to adjust the temperature of the exhaust stream 418 from the gas turbine 102 for controlling the HRSG 802. In embodiments, the sensor 902 may be combined with any of the previously discussed sensor arrangements, for example, as shown with respect to FIGS. 4, 5, and 6. The control of the HRSG 802 and gas turbine 102 may be further enhanced by sensors in other locations, as discussed with respect to FIG. 10.

Figure 10:
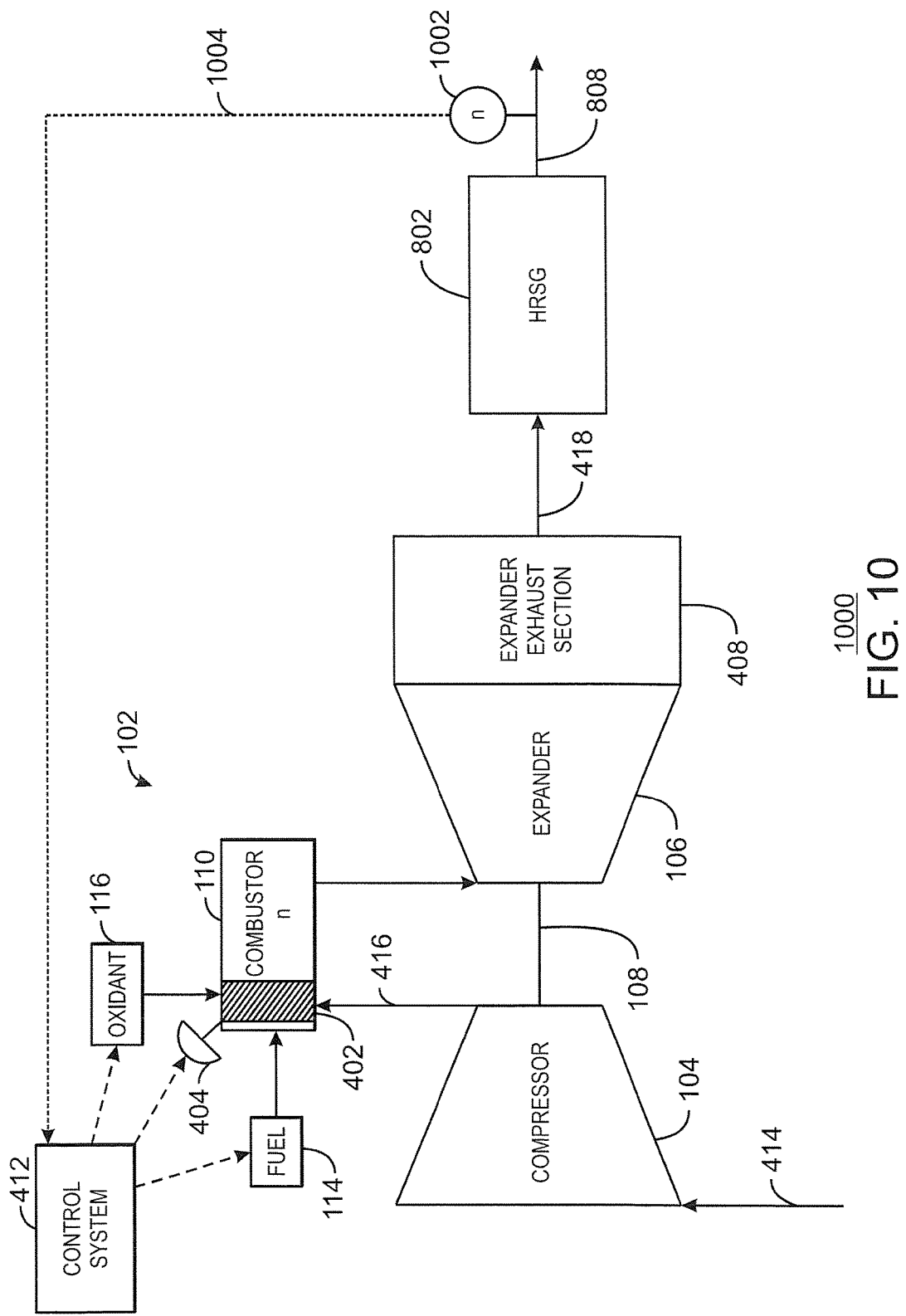
FIG. 10 is a schematic of a gas turbine system that includes a sensor on the cooled exhaust stream from the HRSG.

FIG. 10 is a schematic of a gas turbine system 1000 that includes a sensor 902 on the cooled exhaust stream 808 from the HRSG 802. The referenced units are as described above with respect to FIGS. 1, 4, and 8. A signal 1004 is provided from the sensor 1002 to the control system 412. The sensor 1002 may be a temperature sensor, a pressure sensor, or any of the sensors discussed previously. Further, the sensor 1002 may be a single sensor or a group of sensors, and may be configured to provide information for controlling all of the combustors 110 to adjust the temperature of the exhaust stream 418 from the gas turbine 102. The signal 1004 may be used by the control system 412 to determine the amount of heat harvested by the HRSG 802 versus the amount of heat wasted in the cooled exhaust stream 808. In embodiments, the sensor 1002 may be combined with any or all of the previously discussed sensor arrangements, for example, as shown with respect to FIGS. 4, 5, 6, and 8. The heat in the cooled exhaust stream 808 from the HRSG 802 may be too high for use in downstream units. Therefore a cooler may be used to remove excess heat, as discussed with respect to FIG. 11.

Figure 11:
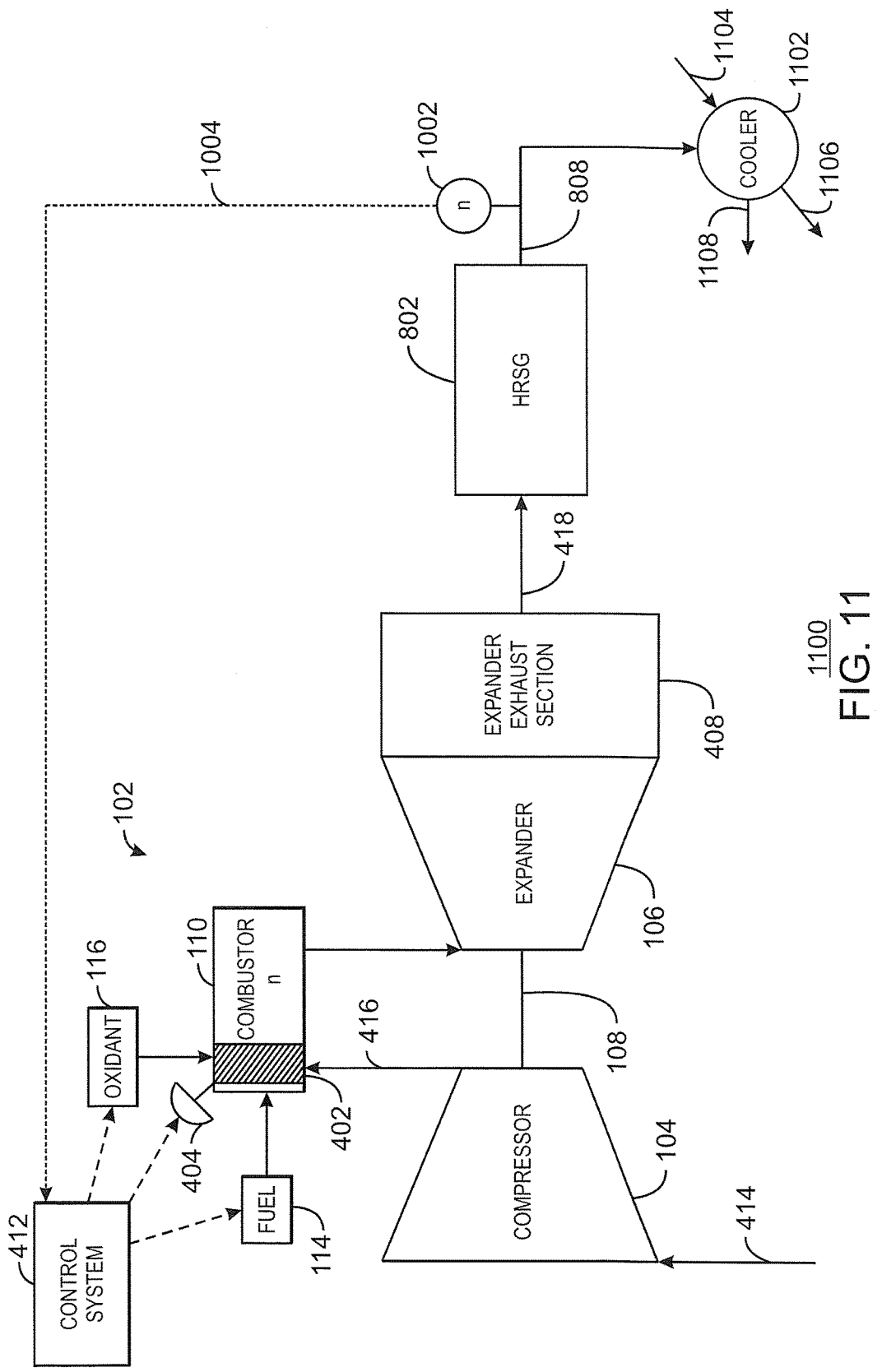
FIG. 11 is a schematic of a gas turbine system that includes a cooler on the cooled exhaust stream from the HRSG.

FIG. 11 is a schematic of a gas turbine system 1100 that includes a cooler 1102 on the cooled exhaust stream 808 from the HRSG 802. The referenced units are as described above with respect to FIGS. 1, 4, 8, and 10. The cooler 1102 may be a non contact heat exchanger, or any number of other types. For example, in an embodiment, the cooler 1102 may be a counter-current direct contact heat exchanger, in which a water stream 1104 is introduced at the top of a vessel, while the cooled exhaust stream 808 is introduced at the bottom of the vessel. As the water contacts the hot exhaust, it cools the stream by both evaporation and heat exchange. A heated water stream 1106 is removed from the bottom of the vessel, and may be cooled before being recycled as the water stream 1104. The outlet exhaust stream 1108 is both cooled and saturated with water vapor, and may be used as a recycle stream, for example to stream 414, as discussed with respect to FIG. 12.

Figure 12:
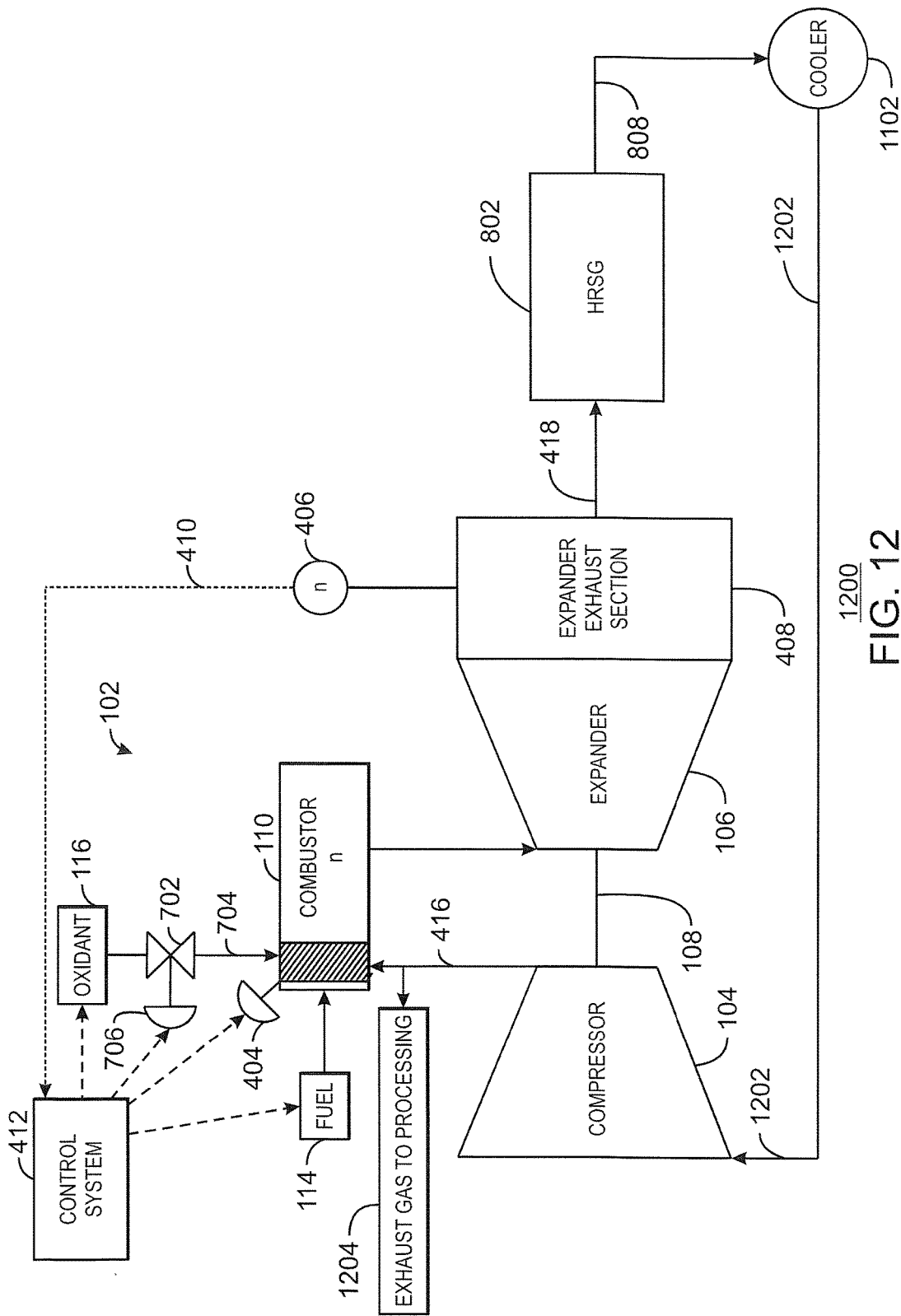
FIG. 12 is a schematic of a gas turbine system that combines features from a number of the systems discussed above.

FIG. 12 is a schematic of a gas turbine system 1200 that combines features from a number of the systems discussed above. The referenced units are as described above with respect to FIGS. 1, 4, 8, and 11. In this embodiment, the saturated exhaust gas 1202 from the cooler 1102 may be recycled to the inlet of the compressor 104. After compression, the saturated exhaust gas 1202 may be fed to the combustor 110 as stream 416 to assist with cooling the combustor 110. A portion of stream 416 may be diverted as an extracted side stream 1204 to a processing system for other use. The processing system may purify the $CO_2$ in the side stream 1204, such as by conversion or removal of any CO and $O_2$, for injection into a hydrocarbon reservoir to enhance oil recovery. Other uses for the diverted gas may include carbon sequestration. In this application, the side stream 1204 may be directly injected into a underground formation for disposal.

Individual Control of Equivalence Ratio to Combustors

The gas turbine systems discussed above may be used to control the combustion process in each of the combustors 110 individually and as a group. As previously mentioned, one goal of the control may be to balance the equivalence ratio of the fuel and oxygen. This may be performed to minimize unburned or partially burned hydrocarbon, represented by the CO concentration in an exhaust stream and to minimize unconsumed oxygen in the exhaust stream. The equivalence ratio is discussed further with respect to FIG. 13.

Figure 13A:
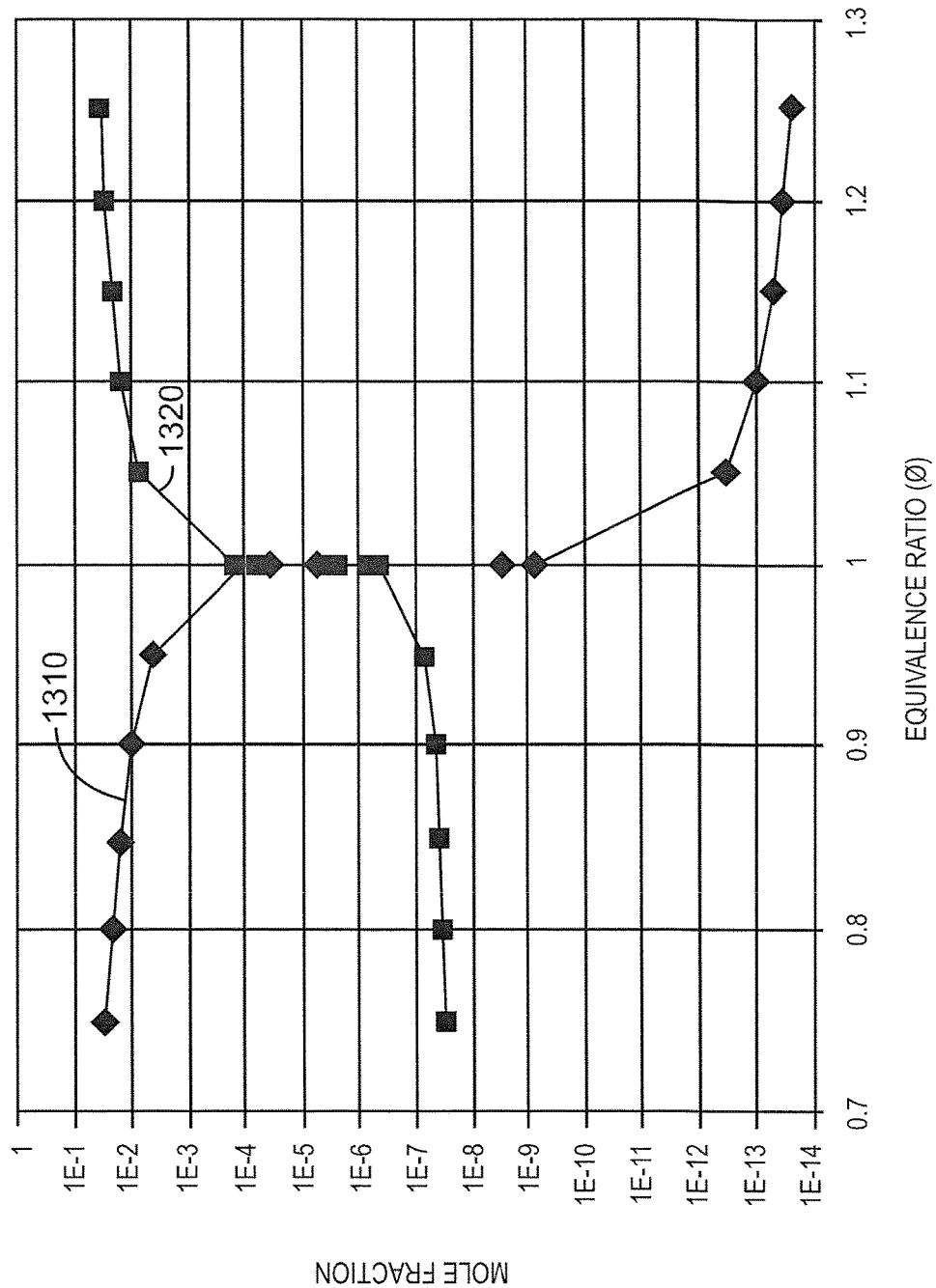
FIGS. 13A and 13B are graphical depictions of a simulation showing the relationship between the concentration of oxygen and carbon monoxide as the equivalence ratio ($\phi$) changes from 0.75 to 1.25 and from 0.999 to 1.001, respectively.
Figure 13B:
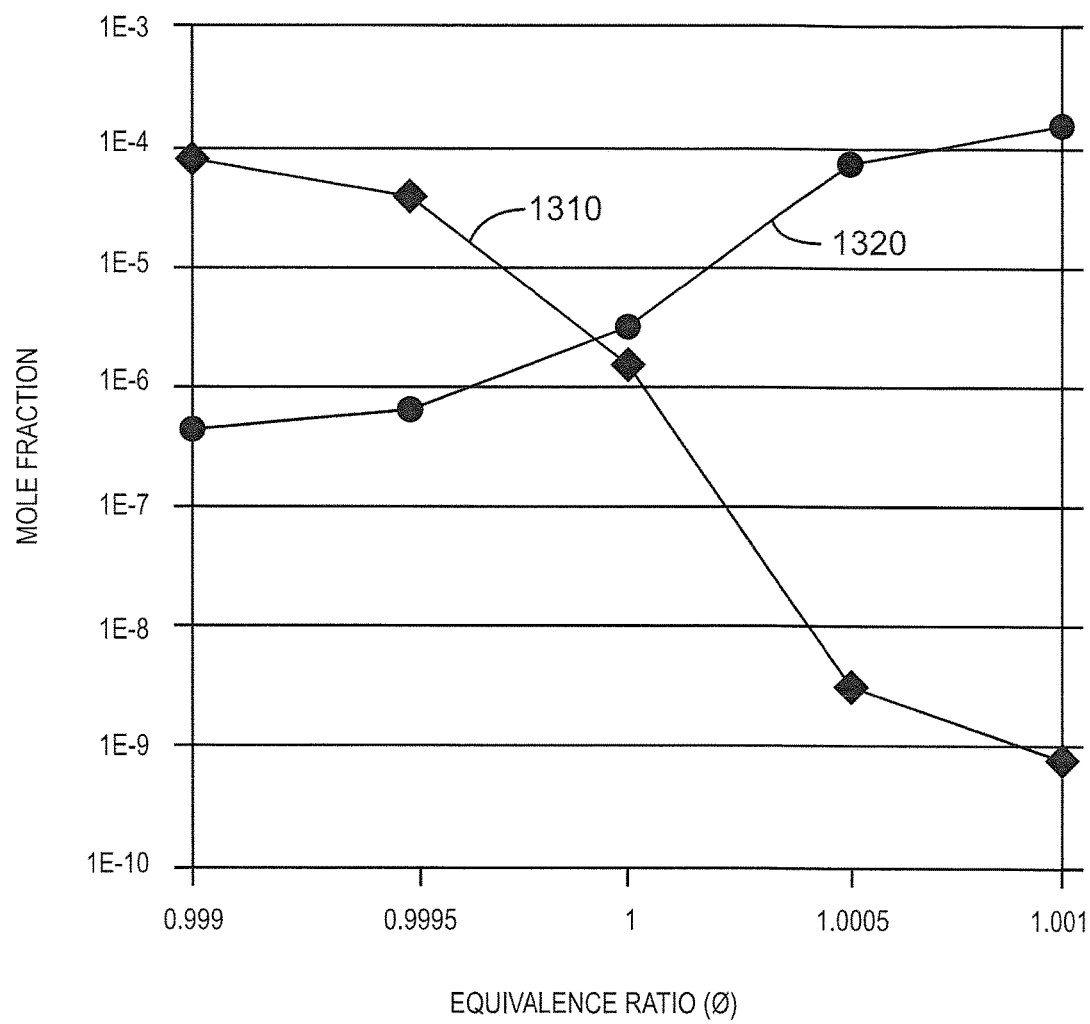

FIGS. 13A and 13B are graphical depictions of a simulation showing the relationship between the concentration of oxygen and carbon monoxide as the equivalence ratio ($\phi$) changes from 0.75 to 1.25 and from 0.999 to 1.001, respectively. The highest efficiency may be achieved when the equivalence ratio is about 1.0. The oxygen concentration as a function of the equivalence ratio is shown as line 1310 and the carbon monoxide concentration as a function of the equivalence ration is shown as line 1320. The equivalence ratio ($\phi$) is equal to (mol % fuel/mol % oxygen)$_{actual}$/(mol % fuel/mol % oxygen)$_{stoichiometric}$. The mol % fuel is equal to $F_{fuel}/(F_{oxygen}+F_{fuel})$, where $F_{fuel}$ is equal to the molar flow rate of fuel and $F_{oxygen}$ is equal to the molar flow rate of oxygen.

The mol % oxygen is equal to $F_{oxygen}/(F_{oxygen}+F_{fuel})$, where $F_{oxygen}$ is equal to the molar flow rate of oxygen and $F_{fuel}$ is equal to the molar flow rate of fuel. The molar flow rate of the oxygen depends on the proportion of oxygen to diluent in the oxidant mixture, and may be calculated as $F_{oxygen}/(F_{oxygen}+F_{diluent})$. As used herein, the flow rate of the oxidant may be calculated as $F_{oxidant}=(F_{oxygen}+F_{diluent})$.

As the equivalence ratio ($\phi$) goes below 1 or above 1 the mole fraction or concentration of oxygen and carbon dioxide in the exhaust gas changes. For example, as the equivalence ratio ($\phi$) goes below 1 the mole fraction of oxygen rapidly increases from about 1 ppm (i.e., an oxygen mole fraction of about $1.0 \times 10^{-6}$) at an equivalence ratio ($\phi$) of about 1 to about 100 ppm (i.e., an oxygen mole fraction of about $1 \times 10^{-4}$) at an equivalence ratio of about 0.999. Similarly, as the equivalence ratio ($\phi$) goes above 1 the concentration of carbon monoxide rapidly increase from about 1 ppm (i.e., carbon monoxide mole fraction of about $1 \times 10^{-6}$) at an equivalence ratio ($\phi$) of about 0.9995 to greater than about 100 ppm (i.e., a carbon monoxide mole fraction of about $1 \times 10^{-4}$) at an equivalence ratio ($\phi$) of about 1.001.

Based, at least in part, on the data obtained from the sensors, such as sensors 406 (FIG. 4), 502 (FIG. 5), or 602 (FIG. 6), the amount of oxidant 116 and/or the amount of fuel 114 to each of the combustors 110 can be adjusted to produce an exhaust stream 418 having a desired composition. For example, monitoring the oxygen and/or carbon monoxide concentration in the exhaust gas in the expander exhaust section 408, the turbine expander 106, or the exhaust line 604 allows the individual adjustment of the amount of oxidant 116 and fuel 114 introduced to each combustor 110 to be controlled such that combustion of the fuel is carried out within a predetermined range of equivalence ratios ($\phi$) in that combustor 110. This can be used to produce an exhaust stream 418 having a combined concentration of oxygen and carbon monoxide of less than about 3 mol %, less than about 2.5 mol %, less than about 2 mol %, less than about 1.5 mol %, less than about 1 mol %, or less than about 0.5 mol %. Furthermore, the exhaust stream 418 may have less than about 4,000 ppm, less than about 2,000 ppm, less than about 1,000 ppm, less than about 500 ppm, less than about 250 ppm, or less than about 100 ppm combined oxygen and carbon monoxide.

A desired or predetermined range for the equivalence ratio ($\phi$) in each combustor 110 can be calculated or entered to carry out the combustion of the fuel 114 to produce an mixed exhaust stream 418 containing a desired amount of oxygen and/or carbon monoxide. For example, the equivalence ratio ($\phi$) in each combustor 110 can be maintained within a predetermined range of from about 0.85 to about 1.15 to produce an exhaust stream 418 having a combined oxygen and carbon monoxide concentration ranging from a low of about 0.5 mol %, about 0.8 mol %, or about 1 mol %, to a high of about 1.5 mol %, about 1.8 mol %, about 2 mol %, or about 2.2 mol %. In another example, the equivalence ratio ($\phi$) in each combustors 110 can be maintained within a range of about 0.85 to about 1.15 to produce an exhaust stream 418 having a combined oxygen and carbon monoxide concentration of less than 2 mol %, less than about 1.9 mol %, less than about 1.7 mol %, less than about 1.4 mol %, less than about 1.2 mol %, or less than about 1 mol %. In still another example, the equivalence ratio ($\phi$) in each of the combustors 110 can be maintained within a range of from about 0.96 to about 1.04 to produce an exhaust stream 418 having a combined oxygen and carbon monoxide concentration of less than about 4,000 ppm, less than about 3,000 ppm, less than about 2,000 ppm, less than about 1,000 ppm, less than about 500 ppm, less than about 250 ppm, or less than about 100 ppm.

It will be noted that the combustors 110 do not have to be at the same set-point, or even within the same range. In embodiments of the present techniques, different or biased set-points may be used for each of the combustors 110 to account for differences in construction, performance, or operation. This may avoid a situation in which different operational characteristics of different combustors 110 cause the exhaust stream 418 to be contaminated with unacceptable levels of oxygen or carbon monoxide.

Accordingly, in embodiments of the present techniques, two methods for operating the gas turbine 102 are used. In a first method, the entire set of combustors 110 is operated as a single entity, for example, during startup and in response to global set-point adjustments, such as speed or power changes. In a second method, the individual combustors 110 may be separately biased, for example, to compensate for differences in wear, manufacturing, and the like.

One method for operating the entire set of combustors 110 can include initially, i.e., on start-up, introducing the fuel 114 and oxygen in the oxidant 116 at an equivalence ratio greater than 1. For example, the equivalence ratio ($\phi$) at startup may range from a low of about 1.0001, about 1.0005, about 1.001, about 1.05, or about 1.1, to a high of about 1.1, about 1.2, about 1.3, about 1.4, or about 1.5. In another example, the equivalence ratio ($\phi$) can range from about 1.0001 to about 1.1, from about 1.0005 to about 1.01, from about 1.0007 to about 1.005, or from about 1.01 to about 1.1. For global adjustments, the concentration of oxygen and/or carbon monoxide in the exhaust stream 418 can be determined or estimated via the sensors 406, 502, or 902. The expanded exhaust gas in the exhaust stream 418 may initially have a high concentration of carbon monoxide (e.g., greater than about 1,000 ppm or greater than about 10,000 ppm) and a low concentration of oxygen (e.g., less than about 10 ppm or less than about 1 ppm).

Another method for operating the entire set of combustors 110 can include initially, i.e., on start-up, introducing the fuel 114 and oxygen in the oxidant 116 at an equivalence ratio of less than 1. For example, the equivalence ratio ($\phi$) at startup may range from a low of about 0.5, about 0.6, about 0.7, about 0.8, or about 0.9 to a high of about 0.95, about 0.98, about 0.99, about 0.999. In another example, the equivalence ratio ($\phi$) can range from about 0.9 to about 0.999 from about 0.95 to about 0.99, from about 0.96 to about 0.99, or from about 0.97 to about 0.99. The expanded exhaust gas in the exhaust stream 418 should initially have a high concentration of oxygen (e.g., greater than about 1,000 ppm or greater than about 10,000 ppm) and a low concentration of carbon monoxide (e.g., less than about 10 ppm or even less than about 1 ppm).

For example, when the concentration of oxygen in the exhaust gas increases from less than about 1 ppm to greater than about 100 ppm, about 1,000 ppm, about 1 mol %, about 2 mol %, about 3 mol %, or about 4 mol %, an operator, the control system 412, or both can be alerted that an equivalence ratio ($\phi$) of less than 1 has been reached. In one or more embodiments, the amount of oxygen via oxidant 116 and fuel 114 can be maintained constant or substantially constant to provide a combustion process having an equivalence ratio ($\phi$) of slightly less than 1, e.g., about 0.99. The amount of oxygen via oxidant 116 can be decreased and/or the amount of fuel 114 can be increased and then maintained at a constant or substantially constant amount to provide a combustion process having an equivalence ratio ($\phi$) falling within a predetermined range. For example, when the concentration of oxygen in the exhaust stream 418 increases from less than about 1 ppm to about 1,000 ppm, about 0.5 mol %, about 2 mol %, or about 4 mol %, the amount of oxygen introduced via the oxidant 116 can be reduced by an amount ranging from a low of about 0.01%, about 0.02%, about 0.03%, or about 0.04 to a high of about 1%, about 2%, about 3%, or about 5% relative to the amount of oxygen introduced via the oxidant 116 at the time the increase in oxygen in the exhaust gas is initially detected. In another example, when the concentration of oxygen in the exhaust stream 418 increases from less than about 1 ppm to about 1,000 ppm or more the amount of oxygen introduced via the oxidant 116 can be reduced by about 0.01% to about 2%, about 0.03% to about 1%, or about 0.05% to about 0.5% relative to the amount of oxygen introduced via the oxidant 116 at the time the increase in oxygen in the exhaust gas is detected. In still another example, when the concentration of oxygen increases from less than about 1 ppm to about 1,000 ppm or more the amount of fuel 114 can be increased by an amount ranging from a low of about 0.01%, about 0.02%, about 0.03%, or about 0.04 to a high of about 1%, about 2%, about 3%, or about 5% relative to the amount of fuel 114 introduced at the time the increase in oxygen in the exhaust gas is initially detected.

During operation of the gas turbine system 102, the equivalence ratio ($\phi$) can be monitored via the sensors 406, 502, or 602 on a continuous basis, at periodic time intervals, at random or non-periodic time intervals, when one or more changes to the gas turbine system 102 occur that could alter or change the equivalence ratio ($\phi$) of the exhaust stream 418, or any combination thereof. For example, changes that could occur to the gas turbine system 102 that could alter or change the equivalence ratio ($\phi$) can include a change in the composition of the fuel, a change in the composition of the oxidant, or a combination thereof. As such, the concentration of oxygen and/or carbon monoxide, for example, can be monitored, and adjustments can be made to the amount of oxidant 116 and/or fuel 114 to control the amounts of oxygen and/or carbon monoxide in the exhaust stream 418.

In at least one embodiment, reducing the equivalence ratio ($\phi$) can be carried out in incremental steps, non-incremental steps, a continuous manner, or any combination thereof. For example, the amount of oxidant 116 and/or the fuel 114 can be adjusted such that the equivalence ratio ($\phi$) changes by a fixed or substantially fixed amount per adjustment to the oxidant 116 and/or fuel 114, e.g., by about 0.001, by about 0.01, or by about 0.05. In another example, the amount of oxidant 116 and/or fuel 114 can be continuously altered such that the equivalence ratio continuously changes. Preferably the amount of oxidant 116 and/or fuel 114 is altered and combustion is carried out for a period of time sufficient to produce an exhaust gas of substantially consistent composition, at which time the amount of oxidant 116 and/or fuel 114 can be adjusted to change the equivalence ratio ($\phi$) in an amount ranging form a low of about 0.00001, about 0.0001, or about 0.0005 to a high of about 0.001, about 0.01, or about 0.05. After the exhaust stream 418 achieves a substantially consistent concentration of oxygen the oxidant 116 and/or fuel 114 can again be adjusted such that the equivalence ratio ($\phi$) changes. The amount of oxygen and/or carbon monoxide in the exhaust stream 418 can be monitored and the amount of oxidant 116 and/or fuel 114 can be repeatedly adjusted until the exhaust stream 418 has a combined concentration of oxygen and carbon monoxide, for example, of less than about 2 mol % or less than about 1.5 mol %, or less than about 1 mol %.

The combustors 110 can be operated on a continuous basis such that the exhaust stream 418 has a combined oxygen and carbon monoxide concentration of less than 2 mol %, less than 1 mol %, less than 0.5 mol %, or less than about 0.1 mol %. In another example, the time during which combustion is carried out within the combustors 110, the exhaust stream 418 can have a combined oxygen and carbon monoxide concentration of less than 2 mol % or less than about 1 mol % for about 50%, 55%, 60%, 65%, 70%, 75%, 80%, 85%, 90%, or about 95% of the time during which the gas turbine 102 is operated. In other words, for a majority of the time that combustion is carried out within the combustors 110, the exhaust stream 418 can have a combined oxygen and carbon monoxide concentration of less than about 2 mol %, less than about 1 mol %, less than about 0.5 mol %, or less than about 0.1 mol %.

Once the overall control of the gas turbine 102 is set, the biasing needed for individual combustors 110 may be determined in the second method. For example, referring to FIG. 4, based on data signals 410 from the sensors 406 in the expander exhaust section 408, the oxidant flow adjusting device 402 for each individual combustor 110 can be adjusted by the control system 412 to maintain the measured value of the sensors 406 at or near to a desired set-point. Several calculated values may be determined from the measured values of each sensor 406. These may include, for example, an average value that can be used to make similar adjustments to all of the oxidant flow adjusting devices 402 in the n combustors 110, as discussed with respect to the first method.

In addition, various difference values, for example, calculated based on differences of the measured values of two or more sensors 406, may be used to make biasing adjustments to the oxidant flow adjusting devices 402 on one or more of the combustors 110 to minimize differences between the measured values of the sensors 406. The control system 412 may also adjust the oxidant system 116 directly, such by adjusting compressor inlet guide vanes (IGV) or a speed control to change the oxidant flow rates, for example, to all of the combustors 110 at once. Further, the control system 412 can make similar adjustments to the fuel 114 to all combustors 110, depending, for example, on the speed selected for the gas turbine 102. As for the oxidant, the fuel supply to each of the combustors 110 may be individually biased to control the equivalence ratio of the burn. This is discussed further with respect to FIG. 15.

Figure 14:
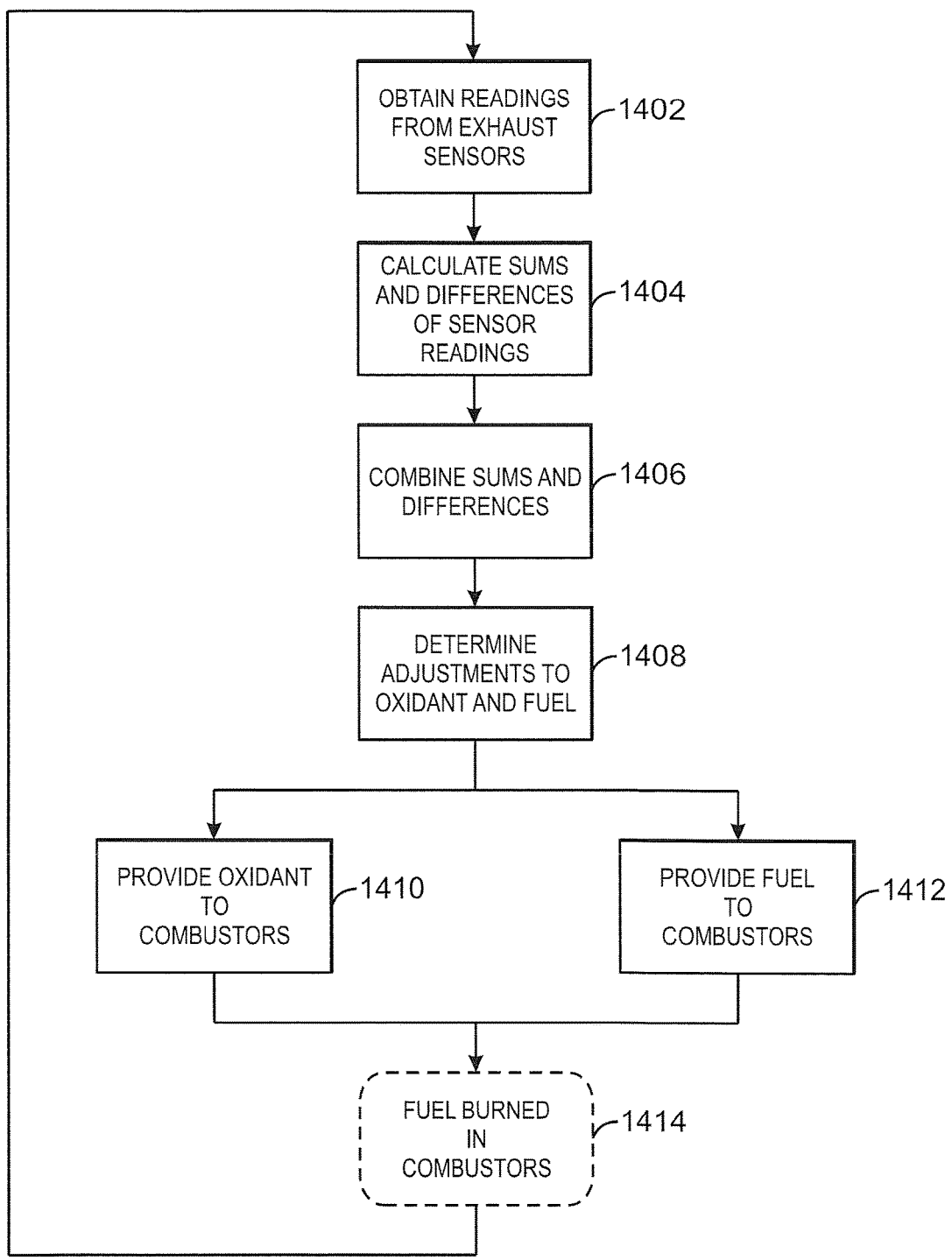
FIG. 14 is a block diagram of a method for biasing individual combustors based on readings from an array of sensors.

FIG. 14 is a block diagram of a method 1400 for biasing individual combustors 110 based on readings from an array of sensors 406. It can be assumed that the gas turbine 102 has been started before this method 1400 begins, and that all of the combustors 110 are using essentially the same mixture or a previous operation point. The method 1400 begins at block 1402 at which readings are obtained from the sensors 406 or 502. At block 1404, sums and differences are determined between the measurements obtained from the individual sensors 406 or 502. At block 1406, the sums and differences may be combined to assist in identifying the combustors 110 that are contributing to a high oxygen or high carbon monoxide condition in the exhaust. This may also be performed by a swirl chart, as described above. Adjustments to the fuel 114 and oxidant 116 for those combustors 110 are calculated at block 1408, for example, using the same considerations for the particular combustors 110 involved as used for adjusting all of the combustors 110 in the first method. At block 1410, the new set-point for the oxidant 116 is entered and oxidant is provided to the combustors 110. In a substantially simultaneous manner, at block 1412, a new set-point is entered for the fuel 114, and fuel 114 is provided to the combustors 110. At block 1414, the combustion process consumed the fuel 114 and oxidant 116 provided. Process flow then returns to block 1402, wherein the method repeats.

More precise measurements may be used to provide finer control over the combustion process. For example, in the sensor arrangement shown in FIG. 6, each combustor 110 has a separate sensor 602 located on an exhaust line 604 from the combustor 110. In this embodiments, the effects of changes to individual combustors 110 may be made, and a precise adjustment to the oxidant 116 and fuel 114 may be made for any combustor 110 providing too high of an oxygen or carbon monoxide exhaust, for example, using the techniques discussed with respect to the first method. These adjustments may be made in addition to any uniform adjustments made in the entire set of combustors 110, for example, in response to a set-point change in the operating speed of the gas turbine 102.

Control System

Figure 15:
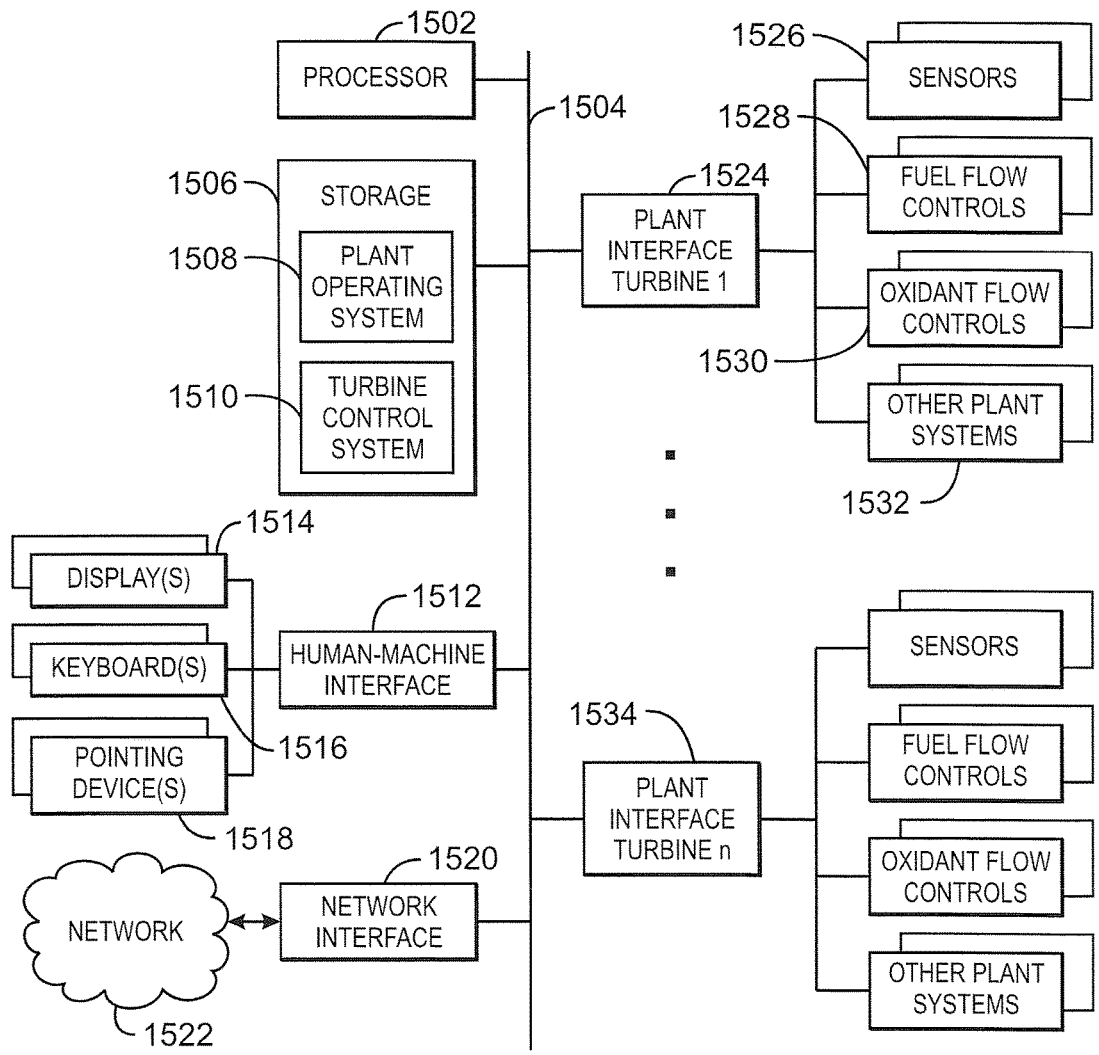
FIG. 15 is a block diagram of a plant control system that may be used to individually control the oxidant and fuel to a number of combustors in a gas turbine.

FIG. 15 is a block diagram of a plant control system 1500 that may be used to individually control the oxidant 116 and fuel 114 to a number of combustors 110 in a gas turbine 102. As previously mentioned, the control system 1600 may be a DCS, a PLC, a DDC, or any other appropriate control device. Further, any controllers, controlled devices, or monitored systems, including sensors, valves, actuators, and other controls, may be part of a real-time distributed control network, such as a FIELDBUS system, in accordance with IEC 61158. The plant control system 1500 may host the control system 412 used for each of the individual combustors 110 on gas turbines 102 in a plant or facility.

The control system 1500 may have a processor 1502, which may be a single core processor, a multiple core processor, or a series of individual processors located in systems through the plant control system 1500. The processor 1502 can communicate with other systems, including distributed processors, in the plant control system 1500 over a bus 1504. The bus 1504 may be an Ethernet bus, a FIELDBUS, or any number of other buses, including a proprietary bus from a control system vendor. A storage system 1506 may be coupled to the bus 1504, and may include any combination of non-transitory computer readable media, such as hard drives, optical drives, random access memory (RAM) drives, and memory, including RAM and read only memory (ROM). The storage system 1506 may store code used to provide operating systems 1508 for the plant, as well as code to implement turbine control systems 1510, for example, bases on the first or second methods discussed above.

A human-machine interface 1512 may provide operator access to the plant control system 1500, for example, through displays 1514, keyboards 1516, and pointing devices 1518 located at one or more control stations. A network interface 1520 may provide access to a network 1522, such as a local area network or wide area network for a corporation.

A plant interface 1524 may provide measurement and control systems for a first gas turbine system. For example, the plant interface 1524 may read a number of sensors 1526, such as the sensors 406, 502, 602, 902, and 1002 described with respect to FIGS. 4, 5, 6, 9, and 10. The plant interface 1524 may also make adjustments to a number of controls, including, for example, fuel flow controls 1528 used adjust the fuel 114 to the combustors 110 on the gas turbine 102. Other controls include the oxidant flow controls 1530, used, for example, to adjust the actuator 404 on an oxidant flow adjusting device 402, the actuator 706 on a oxidant flow adjusting valve 702, or both, for each of the combustors 110 on the gas turbine 102. The plant interface 1524 may also control other plant systems 1532, such as generators used to produce power from the mechanical energy provided by the gas turbine 102. The additional plant systems 1532 may also include the compressor systems used to provide oxidant 116 to the gas turbine 102.

The plant control system 1500 is not limited to a single plant interface 1524. If more turbines are added, additional plant interfaces 1534 may be added to control those turbines. Further, the distribution of functionality is not limited to that shown in FIG. 15. Different arrangements could be used, for example, one plant interface system could operate several turbines, while another plant interface system could operate compressor systems, and yet another plant interface could operate generation systems.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A gas turbine system, comprising:
an oxidant system;
a fuel system;
a control system;
a plurality of combustors adapted to receive and combust an oxidant from the oxidant system and a fuel from the fuel system to produce a plurality of exhaust gases;
a plurality of oxidant-flow adjustment devices, wherein each of the plurality of oxidant-flow adjustment devices is operatively associated with one of the plurality of combustors, wherein at least one of the oxidant-flow adjustment devices is configured to independently regulate an oxidant flow rate into an associated combustor to achieve substantially stoichiometric combustion; and
a plurality of exhaust sensors in communication with the control system, wherein the exhaust sensors are adapted to measure an oxygen concentration and a carbon monoxide concentration in each of the plurality of exhaust gases, and wherein the control system is configured to independently adjust at least one of the plurality of oxidant-flow adjustment devices based, at least in part, on the oxygen concentrations and carbon monoxide concentrations measured by the plurality of exhaust sensors to maintain a combined oxygen and carbon monoxide concentration of the plurality of exhaust gases within a predetermined range.

2. The system of claim 1, wherein the oxidant comprises oxygen and a diluent.

3. The system of claim 1, further comprising a diluent supply provided to each of the plurality of combustors.

4. The system of claim 1, further comprising an oxidant compressor adapted to provide compressed oxidant to each of the plurality of combustors.

5. The system of claim 1, wherein the oxidant-flow adjustment device comprises a flow control valve.

6. The system of claim 1, wherein the oxidant-flow adjustment device comprises an adjustable swirler sub assembly.

7. The system of claim 6, wherein the adjustable swirler sub assembly comprises an annular control assembly positioned around a flow sleeve to controllably regulate oxidant flow rates into the flow sleeve.

8. The system of claim 7, wherein the annular control assembly comprises a plurality of articulating vanes operatively associated with a mounting ring and an actuator vane.

9. The system of claim 8, wherein the plurality of vanes are adapted to be controllably adjusted between an open position and a closed position and positions therebetween by moving the actuator vane relative to the mounting vane.

10. The system of claim 1, wherein the plurality of exhaust sensors and the control system are adapted to regulate oxidant flow rates to the plurality of combustors so as to minimize differences between measured parameters at different exhaust sensors.

11. The system of claim 1, wherein the oxidant-flow adjustment device on at least one of the plurality of combustors is adapted to increase mixing of the oxidant, the fuel, a diluent, or any combinations thereof.

12. The system of claim 1, wherein a combustor comprises a diluent inlet and an oxidant inlet, wherein the oxidant-flow adjustment device is disposed in the oxidant inlet, and wherein the oxidant-flow adjustment device is configured to mix the oxidant and the diluent before the fuel is introduced.

13. The system of claim 1, further comprising a turbine expander adapted to receive the exhaust gas and to generate power.

14. The system of claim 13, further comprising a heat recovery steam generator adapted to receive the exhaust gas from the turbine expander and to generate power.

15. The system of claim 13, further comprising a diluent compressor and an exhaust gas recirculation loop adapted to receive the exhaust gas from the expander, wherein the exhaust gas recirculation loop comprises a heat recovery steam generator adapted to generate power, and a cooled exhaust line adapted to provide cooled exhaust gas to the diluent compressor, and wherein the diluent compressor is adapted to provide compressed diluent to the combustor.

16. The system of claim 15, further comprising an exhaust gas extraction system disposed between the diluent compressor and the combustor, wherein the exhaust gas extraction system is adapted to extract diluent at elevated pressures.

17. The gas turbine system of claim 1, wherein the predetermined range is between about 0.1 mol % and about 3 mol % combined oxygen and carbon monoxide concentration.

18. A method of controlling a gas turbine, the method comprising:
providing a fuel to a plurality of combustors on a gas turbine;
providing an oxidant to the plurality of combustors, wherein an oxidant flow rate is independently adjusted for each of the plurality of combustors;
substantially stoichiometrically combusting the fuel and the oxidant in each of the plurality of combustors to produce a plurality of exhaust gases;
measuring an oxygen concentration and a carbon monoxide concentration in each of the plurality of exhaust gases; and
adjusting the oxidant flow rate into each of the plurality of combustors based on the measured oxygen concentrations and carbon monoxide concentrations to maintain a combined oxygen and carbon monoxide concentration of the plurality of exhaust gases within a predetermined range.

19. The method of claim 18, further comprising compressing the oxidant before the oxidant is provided to each of the plurality of combustors.

20. The method of claim 18, further comprising returning a portion of the exhaust gas to the plurality of combustors as a diluent.

21. The method of claim 20, further comprising compressing the diluent with a compressor before the diluent enters the combustor.

22. The method of claim 21, wherein the compressor is operatively coupled to an expander adapted to receive the exhaust gas and to generate power therefrom.

23. The method of claim 22, further comprising extracting at least a portion of the exhaust gas from a coupling disposed between the compressor and each of the plurality of combustors, wherein the amount of exhaust gas extracted is based, at least in part, on the parameter.

24. The method of claim 18, wherein the predetermined range is between about 0.1 mol % and about 3 mol % combined oxygen and carbon monoxide concentration.

25. A non-transitory computer readable medium comprising code configured to direct a processor to:
provide a fuel to a plurality of combustors on a gas turbine;
provide an oxidant to the plurality of combustors, wherein an oxidant flow rate is independently adjusted for each of the plurality of combustors;
monitor an oxygen concentration and a carbon monoxide concentration in each of a plurality of exhaust gases produced in a flame in each of the plurality of combustors; and
adjust the oxidant flow rate into each of the plurality of combustors based on the measured oxygen concentrations and carbon monoxide concentrations to maintain a combined oxygen and carbon monoxide concentration of the plurality of exhaust gases within a predetermined range to achieve substantially stoichiometric combustion.

26. The non-transitory computer readable medium of claim 25, comprising a data structure representing a swirl chart.

27. The non-transitory computer readable medium of claim 26, comprising code configured to direct the processor to compare measurements associated with a plurality of sensors to the data structure to determine which of the plurality of combustors to adjust.

28. The non-transitory computer readable medium of claim 25, comprising code configured to direct the processor to regulate oxidant flow rates to each of the plurality of combustors so as to minimize differences between measured oxygen concentrations and carbon monoxide concentrations at different exhaust sensors.

29. A gas turbine system, comprising:
an oxidant system;
a fuel system;
a control system;
a plurality of combustors adapted to receive and combust an oxidant from the oxidant system and a fuel from the fuel system to produce an exhaust gas;
a plurality of oxidant-flow adjustment devices, wherein each of the plurality of oxidant-flow adjustment devices is operatively associated with one of the plurality of combustors, wherein at least one of the oxidant-flow adjustment devices is configured to independently regulate an oxidant flow rate into an associated combustor and wherein at least one of the oxidant-flow adjustment devices comprises an adjustable swirler sub assembly having an annular control assembly positioned around a flow sleeve to controllably regulate oxidant flow rates into the flow sleeve, the annular control assembly comprising a plurality of articulating vanes operatively associated with a mounting ring and an actuator vane; and an exhaust sensor in communication with the control system, wherein the exhaust sensor is adapted to measure at least one parameter of the exhaust gas, and wherein the control system is configured to independently adjust one of the plurality of oxidant-flow adjustment devices based, at least in part, on the parameter measured by the exhaust sensor.

30. The system of claim 29, wherein the plurality of vanes are adapted to be controllably adjusted between an open position and a closed position and positions therebetween by moving the actuator vane relative to the mounting vane.

31. The non-transitory computer readable medium of claim 25, wherein the predetermined range is between about 0.1 mol % and about 3 mol % combined oxygen and carbon monoxide concentration.

* * * * *